United States Patent
Kurane

(10) Patent No.: US 7,884,868 B2
(45) Date of Patent: Feb. 8, 2011

(54) IMAGE CAPTURING ELEMENT, IMAGE CAPTURING APPARATUS, IMAGE CAPTURING METHOD, IMAGE CAPTURING SYSTEM, AND IMAGE PROCESSING APPARATUS

(75) Inventor: Haruhisa Kurane, Shiojiri (JP)

(73) Assignee: Seiko Epson Corporation (JP)

( * ) Notice: Subject to any disclaimer, the term of this patent is extended or adjusted under 35 U.S.C. 154(b) by 870 days.

(21) Appl. No.: 11/625,528

(22) Filed: Jan. 22, 2007

(65) Prior Publication Data

US 2007/0171298 A1 Jul. 26, 2007

(30) Foreign Application Priority Data

Jan. 23, 2006 (JP) ............................. 2006-013598
Nov. 24, 2006 (JP) ............................. 2006-316726

(51) Int. Cl.
*H04N 3/14* (2006.01)
*H04N 5/335* (2006.01)

(52) U.S. Cl. ..................... 348/297; 348/296; 348/301

(58) Field of Classification Search ................ 348/155, 348/296, 297, 300, 301

See application file for complete search history.

(56) References Cited

U.S. PATENT DOCUMENTS 6,529,241 B1 * 3/2003 Clark .......................... 348/308

* cited by examiner

*Primary Examiner*—David L Ometz
*Assistant Examiner*—Dillon Durnford-Geszvain
(74) *Attorney, Agent, or Firm*—Harness, Dickey & Pierce, P.L.C.

(57) ABSTRACT

An image capturing element having an electric shutter function of controlling exposure time for each frame includes: a photoelectric converter that has a plurality of photoelectric conversion elements arranged in a matrix each of which converts light into charge and stores the converted charge; a first reading unit that reads charge exposed for a predetermined exposure time from each pixel formed by the photoelectric conversion element in the entire exposure region of the photoelectric converter by a destructive readout method; and a second reading unit that reads charge from each pixel formed by the photoelectric conversion element in a specific region, which is a portion of the entire exposure region of the photoelectric converter, plural times by a non-destructive readout method in a period in which the first reading unit reads the charge from the entire exposure region.

3 Claims, 15 Drawing Sheets

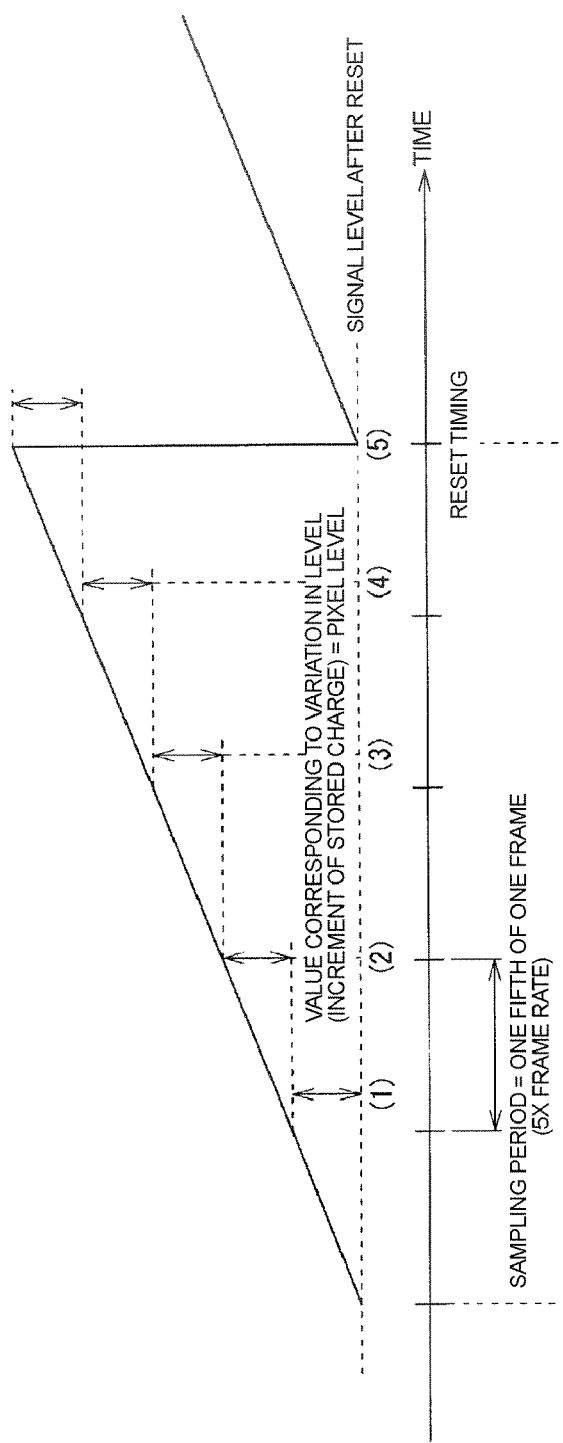
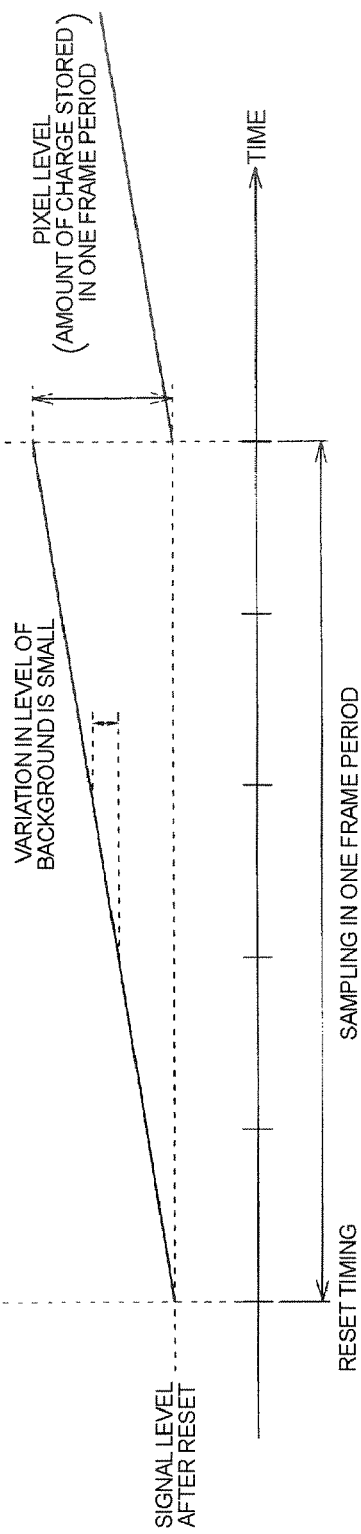
FIG. 9A
FIG. 9B

IMAGE CAPTURING ELEMENT, IMAGE CAPTURING APPARATUS, IMAGE CAPTURING METHOD, IMAGE CAPTURING SYSTEM, AND IMAGE PROCESSING APPARATUS

BACKGROUND

1. Technical Field

The present invention relates to an image capturing element, an image capturing apparatus, an image capturing method and an image capturing system capable of reading charge from photoelectric conversion elements by a destructive readout method and a non-destructive readout method and to an image processing apparatus capable of generating captured image data on the basis of charge read by a destructive readout method and a non-destructive readout method.

2. Related Art

In the related art, a destructive readout method and a non-destructive readout method have been used to read out charge from image sensors (photoelectric conversion elements) of an image capturing apparatus.

The destructive readout method includes a reset process of clearing charge stored in the photoelectric conversion element when reading the charge (pixel signal) from the photoelectric conversion element.

The non-destructive readout method reads out the charge (pixel signal) from the photoelectric conversion element without clearing the charge stored in the photoelectric conversion element. That is, the non-destructive readout method does not perform the reset process when reading the charge. Therefore, in the non-destructive readout method, it is possible to read charge at different exposure times again and again until exposure time reaches a set value while the charge is being stored in the photoelectric conversion element. Thus, the non-destructive readout method makes it possible to easily realize multistage exposure.

Further, in the related art, the following monitoring method using an outdoor surveillance camera has been proposed: a light source is provided around the camera and radiates light to a specific region, which makes it possible for a guard to monitor whether an object is entered into specific region. This method is similar to a method of capturing the image of a person in the dark place using an electronic flash. That is, when light emitted from a light source is reflected from a subject, the camera receives the reflected light and records the image of the subject. Meanwhile, since flashlight does not reach a distant dark background, it is necessary to lengthen the exposure time to capture the image of the distant background, and the background image is recorded on the camera.

In the above-mentioned surveillance camera, it is preferable to capture the image of a distant background and a specific region (near object). In this case, a wide dynamic lens camera (image capturing element) needs to be used to capture an image having high contrast. A non-destructive image capturing element has been proposed as an image capturing element for realizing the wide dynamic lens camera. An image capturing apparatus disclosed in JP-A-5-22670 and a solid-state image capturing element disclosed in JP-A-7-38815 have been known as the non-destructive image capturing element having the wide dynamic lens.

The image capturing apparatus disclosed in JP-A-5-22670 includes a plurality of pixels each having an amplification-type photoelectric conversion element, and reads a plurality of pixel signals having different exposure times. When a saturation pixel signal is detected from one pixel signal having long exposure time, the saturation pixel signal is replaced with a non-saturation pixel signal of the pixel having short exposure time, thereby realizing a wide dynamic lens.

The solid-state image capturing element disclosed in JP-A-7-38815 is provided with a vertical scanning circuit that outputs first and second read signals having different timings within a horizontal effective period to a light receiving unit having photoelectric conversion elements as pixels arranged in a matrix in plan view and a horizontal scanning circuit that inputs a start signal two times within the horizontal effective period. The two reading operations are performed with the horizontal scanning period at a predetermined interval, and pixel signals are independently read out without providing a plurality of vertical signals lines, thereby realizing a wide dynamic lens.

The techniques disclosed in JP-A-5-22670 and JP-A-7-38815 can realize a wide dynamic lens. However, for example, when a subject to be photographed moves relative to a dark background and thus a frame rate (exposure time) is matched with the moving subject, the background appears to be dark in the captured image, which makes it difficult to recognize the content of the background. On the other hand, when image capturing is performed with the frame rate being matched with the background, the frame rate (exposure time) increases and motion blur occurs in the captured image, which makes it difficult to determine the movement of an object to be monitored.

SUMMARY

An advantage of some aspects of the invention is that it provides an image capturing element, an image capturing apparatus, an image capturing method, an image capturing system, and an image processing apparatus capable of capturing the image of a background and a subject moving relative to the background with high contrast so that the content of the captured image can be easily recognized.

First Aspect

According to a first aspect of the invention, there is provided an image capturing element that has an electric shutter function of controlling exposure time for each frame. The image capturing element includes: a photoelectric converter that has a plurality of photoelectric conversion elements arranged in a matrix each of which converts light into charge and stores the converted charge; a first reading unit that reads charge exposed for a predetermined exposure time from each pixel formed by the photoelectric conversion element in the entire exposure region of the photoelectric converter by a destructive readout method; and a second reading unit that reads charge from each pixel formed by the photoelectric conversion element in a specific region, which is a portion of the entire exposure region of the photoelectric converter, plural times by a non-destructive readout method in a period in which the first reading unit reads the charge from the entire exposure region.

According to the above-mentioned structure, the first reading unit can read the charge exposed for a predetermined exposure time from each pixel formed by the photoelectric conversion element in the entire exposure region of the photoelectric converter by the destructive readout method, and the second reading unit can read the charge from each pixel formed by the photoelectric conversion element in a specific region, which is a portion of the entire exposure region of the photoelectric converter, plural times by the non-destructive readout method in a period in which the first reading unit reads the charge from the entire exposure region.

That is, the first reading unit can read the charge exposed for a predetermined exposure time from the pixels in the entire exposure region (entire scanning region) of the photoelectric converter by the destructive readout method. In addition, the second reading unit can read the charges that are exposed for plural types of different exposure times shorter than the predetermined exposure time from the pixels in a specific region, which is a portion of the entire exposure region of the photoelectric converter, by the non-destructive readout method.

Therefore, for example, for a subject including a moving object and a relatively dark background, pixels of the entire exposure region corresponding to the dark background are exposed for a sufficient amount of time to obtain an image in which the content of the background can be recognized, and charges are read from the pixels of the entire exposure region by the first reading unit, which makes it possible to obtain a background image that is exposed for long exposure time. Meanwhile, during the long exposure time, a region including the moving object and a peripheral region thereof are set as a specific region, and charges are sequentially read from pixels in the specific region that are sequentially exposed for plural types (for example, five types) of exposure times each shorter than the long exposure time by the non-destructive readout method, which makes it possible to obtain the image of the specific region that is exposed for plural types of exposure times at a frame rate higher than the frame rate at the long exposure time. In this way, it is possible to obtain the background image (the image of the entire exposure region) that is exposed for a sufficient amount of time and the image of the specific region including the moving object that is exposed in multiple states. In addition, when the background image and the image of the specific region are combined with each other, it is possible to obtain an image having the object and the background with high contrast and to accurately capture the image of a moving object. In addition, since the image of a moving object is captured in the specific region, it is also possible to reduce the amount of processing in a movement detecting process.

The 'photoelectric converter' is formed by using, for example, a CMOS technique, and a threshold value modulation image capturing element (for example, a threshold voltage modulation image sensor) is used as an image capturing element capable of reading charge by a non-destructive readout method that uses the CMOS technique. This is also applied to an image capturing apparatus, an image capturing method, an image capturing system, and an image processing apparatus.

Second Aspect

According to a second aspect of the invention, there is provided an image capturing apparatus that has an electric shutter function of controlling exposure time for each frame. The image capturing apparatus includes: a photoelectric converter that has a plurality of photoelectric conversion elements arranged in a matrix each of which converts light into charge and stores the converted charge; a first reading unit that reads charge exposed for a predetermined exposure time from each pixel formed by the photoelectric conversion element in the entire exposure region of the photoelectric converter by a destructive readout method; a second reading unit that reads charge from each pixel formed by the photoelectric conversion element in a specific region, which is a portion of the entire exposure region of the photoelectric converter, plural times by a non-destructive readout method in a period in which the first reading unit reads the charge from the entire exposure region; a first image data generating unit that generates first image data on the basis of first pixel data composed of the charge that is read by the first reading unit from the entire exposure region by exposure for a predetermined exposure time; a first image data storage unit that stores the first image data generated by the first image data generating unit; a second image data generating unit that generates second image data on the basis of plural types of second pixel data composed of charges that are read by the second reading unit from the specific region by exposure for different exposure times; a second image data storage unit that stores the second image data generated by the second image data generating unit; and a captured image data generating unit that combines the stored second image data and the stored first image data to generate captured image data.

According to the above-mentioned structure, the first reading unit can read the charge exposed for a predetermined exposure time from each pixel formed by the photoelectric conversion element in the entire exposure region of the photoelectric converter by the destructive readout method, and the second reading unit can read the charge from each pixel formed by the photoelectric conversion element in a specific region, which is a portion of the entire exposure region of the photoelectric converter, plural times by the non-destructive readout method in a period in which the first reading unit reads the charge from the entire exposure region.

The first image data generating unit can generate first image data on the basis of first pixel data composed of the charge that is read by the first reading unit from the entire exposure region by exposure for a predetermined exposure time. The first image data storage unit can store the first image data generated by the first image data generating unit. The second image data generating unit can generate second image data on the basis of plural types of second pixel data composed of charges that are read by the second reading unit from the specific region by exposure for different exposure times. The second image data storage unit can store the second image data generated by the second image data generating unit.

In addition, the captured image data generating unit can combine the stored second image data and the stored first image data to generate captured image data.

Therefore, for example, for a subject including a moving object and a relatively dark background, pixels of the entire exposure region corresponding to the dark background are exposed for a sufficient amount of time to obtain an image in which the content of the background can be recognized, and charges are read from the pixels of the entire exposure region by the first reading unit, which makes it possible to obtain a background image that is exposed for long exposure time. Meanwhile, during the long exposure time, a region including the moving object and a peripheral region thereof are set as a specific region, and charges are sequentially read from pixels in the specific region that are sequentially exposed for plural types (for example, five types) of exposure times each shorter than the long exposure time by the non-destructive readout method, which makes it possible to obtain the image of the specific region that is exposed for plural types of exposure times at a frame rate higher than the frame rate at the long exposure time. In addition, it is possible to combine the background image (the image of the entire exposure region) that is exposed for a sufficient amount of time with the image of the specific region including the moving object that is exposed in multiple states. As a result, it is possible to obtain an image having the object and the background with high contrast and to accurately capture the image of a moving object.

Third Aspect

According to a third aspect of the invention, preferably, the image capturing apparatus according to the second aspect further includes a specific region reference signal generating unit that generates a reference signal for designating the range of the specific region in the entire exposure region.

According to the above-mentioned structure, the image capturing apparatus can automatically generate a reference signal (vertical synchronization signal 1) for designating the range of the specific region in asynchronism with a reference signal (vertical synchronization signal 0) designating the entire exposure region. Therefore, it is possible to easily count a pixel number and a line number of the specific region from the vertical synchronization signal 1.

Fourth Aspect

According to a fourth aspect of the invention, preferably, in the image capturing apparatus according to the second or third aspect, the second pixel data is composed of differential values between pixel values of pixel data composed of charges that are read plural times by the second reading unit at plural types of exposure times and a pixel value of pixel data composed of charge that is read by the second reading unit at an exposure time shorter than each of the plural types of exposure times.

According to the above-mentioned structure, the second pixel data can be formed on the basis of the differential value between pixel data at every two exposure times among the plural types of exposure times, which makes it possible to acquire an image at short exposure time, that is, a high frame rate. In addition, it is possible to reduce or remove fixed pattern noise, which has caused problems in the non-destructive readout method.

As a result, it is possible to prevent or reduce the deterioration of display quality due to the fixed pattern noise.

For example, the 'fixed pattern noise' is caused by dark current shading, which has caused problems at an exposure for a long time or a difference in sensitivity between pixels.

The second pixel data may be composed of the differential values or values obtained by, for example, correcting the differential values.

Fifth Aspect

According to a fifth aspect of the invention, in the image capturing apparatus according to the fourth aspect, preferably, the charge read at the exposure time shorter than each of the plural types of exposure times is charge read at the exposure time immediately before each of the exposure times.

According to the above-mentioned structure, the second pixel data can be formed on the basis of the differential value between pixel data read at each of the plural types of exposure times and pixel data read at exposure time immediately before each of the plural types of exposure times, which makes it possible to acquire an image at a high frame rate.

Sixth Aspect

According to a sixth aspect of the invention, in the image capturing apparatus according to any one of the second to fifth aspects, preferably, the second image data generating unit determines whether each of the second pixel data is available on the basis of the comparison of the pixel value of each of the second pixel data read from the specific region by the second reading unit with a predetermined threshold value. Preferably, when it is determined that the second pixel data is available, the second image data generating unit updates the second image data stored in the second image data storage unit on the basis of the second pixel data.

According to the above-mentioned structure, for a subject including a moving object and a background in the night, when a brightness value indicating second pixel data corresponding to the charge read from pixels of a specific region by the second reading unit is larger than a predetermined brightness value, the second pixel data is determined to be available, and the second image data stored in the second image data storage unit can be updated on the basis of the second pixel data.

That is, since the background is further away from the image capturing apparatus than the object in addition to the night, a large difference in brightness occurs between the object and the background. Therefore, the second pixel data having a relatively high brightness value is more likely to be data of the object, and thus the second pixel data forming the second image data stored in the second image data storage unit at the same pixel position as that where the second pixel data is stored is updated on the basis of the second pixel data.

In this way, it is possible to easily generate captured image data of a moving object in a specific region. The predetermined threshold value is appropriately set according to the difference in brightness between the object and the background, which makes it possible for an image capturing apparatus to capture the image of an object in various types of backgrounds.

Seventh Aspect

According to a seventh aspect of the invention, in the image capturing apparatus according to the sixth aspect, preferably, when it is determined that the second pixel data is unavailable on the basis of the result of the comparison, the second image data generating unit updates the second image data stored in the second image data storage unit on the basis of the first pixel data that is stored in the first image data storage unit at the same pixel position as that where the second pixel data is stored.

According to the above-mentioned structure, for a subject including a moving object and a background in the night, when a brightness value indicating second pixel data corresponding to the charge read from pixels of a specific region by the second reading unit is smaller than a predetermined brightness value, the second pixel data is determined to be unavailable, and the second image data stored in the second image data storage unit can be updated on the basis of the first pixel data that is stored in the first image data storage unit at the same pixel position as that where the second pixel data is stored.

That is, since the background is further away from the image capturing apparatus than the object in addition to the night, a large difference in brightness occurs between the object and the background. Therefore, the second pixel data having a relatively low brightness value is more likely to be data of the background, and thus the second pixel data forming the second image data stored in the second image data storage unit is updated on the basis of the first pixel data that is stored in the first image data storage unit at the same pixel position as that where the second pixel data is stored. Therefore, it is possible to obtain an image having the object and the background with high contrast and to generate the image of a specific region in which a moving object is accurately captured.

Eighth Aspect

According to an eighth aspect of the invention, in the image capturing apparatus according to the sixth or seventh aspect, preferably, when a brightness value indicating the pixel value of the second pixel data is equal to or larger than a predetermined threshold value, the second image data generating unit determines that the second pixel data is available.

According to the above-mentioned structure, for a subject including a moving object and a background in the night, when a brightness value indicating second pixel data corresponding to the charge read from pixels of a specific region by the second reading unit is equal to or larger than a predetermined brightness value, the second pixel data is determined to be unavailable That is, since the background is further away from the image capturing apparatus than the object in addition to the night, a large difference in brightness occurs between the object and the background. Therefore, the second pixel data having a relatively large brightness value is more likely to be data of the object, and thus the second pixel data forming the second image data stored in the second image data storage unit at the same pixel position as that where the second pixel data is stored is updated. Therefore, the second pixel data makes it possible to easily generate captured image data of a moving object in a specific region.

Ninth Aspect

According to a ninth aspect of the invention, in the image capturing apparatus according to any one of the third to eighth aspects, preferably, the second image data generating unit corrects the pixel value of the second pixel data on the basis of the number of times the second reading unit reads charge from each pixel of the specific region.

According to the above-mentioned structure, the second pixel data can be corrected to have the same brightness level as that of the first pixel data when exposing the second pixel data at the same exposure time as that of the first pixel data, which makes it possible to prevent the deterioration of display quality due to an insufficient brightness level.

For example, in a predetermined exposure period in which the first reading unit reads charge, when the second reading unit reads charge from pixels in a specific region for plural types of exposure times to acquire pixel signals, the second reading unit performs exposure for exposure time shorter than a predetermined exposure time plural times. The brightness level of the second pixel data obtained in this way is lower than that of the first pixel data by a value corresponding to the shortened exposure time. Therefore, the brightness level of the second pixel data is corrected according to each of the plural types of exposure times. When the second pixel data is generated as differential data as in the fifth aspect, the differential value can be multiplied by the number of types to correct the brightness level. For example, when exposure is performed for five types of exposure times, the differential value increases by five times, which makes it possible to correct the brightness level of the second pixel data so as to be equal to that of the first pixel data.

Tenth Aspect

According to a tenth aspect of the invention, in the image capturing apparatus according to any one of the third to ninth aspects, preferably, the first image data generating unit determines whether each of the first pixel data is available on the basis of the comparison of the pixel value of each of the first pixel data read from the entire exposure region by the first reading unit with a predetermined threshold value. Preferably, when it is determined that the first pixel data is available, the first image data generating unit updates the first image data stored in the first image data storage unit on the basis of the first pixel data.

According to the above-mentioned structure, for a subject including a moving object and a background in the night, when a brightness value indicating first pixel data corresponding to the charge read from pixels of the entire exposure region by the first reading unit is equal to or smaller than a predetermined brightness value, the first pixel data is determined to be available, and the first image data stored in the first image data storage unit can be updated on the basis of the first pixel data.

That is, since the background is further away from the image capturing apparatus than the object in addition to the night, a large difference in brightness occurs between the object and the background. Therefore, the first pixel data having a relatively small brightness value is more likely to be data of the background, and thus the first pixel data forming the first image data stored in the first image data storage unit at the same pixel position as that where the first pixel data is stored is updated. Therefore, the first pixel data makes it possible to easily generate captured image data of the background.

Eleventh Aspect

According to an eleventh aspect of the invention, in the image capturing apparatus according to the tenth aspect, preferably, when a brightness value indicating the pixel value of the first pixel data is equal to or smaller than the predetermined threshold value, the first image data generating unit determines that the first pixel data is available.

According to the above-mentioned structure, for a subject including a moving object and a background in the night, when a brightness value indicating first pixel data corresponding to the charge read from pixels of the entire exposure region by the first reading unit is equal to or smaller than a predetermined brightness value, the first pixel data can be unavailable.

That is, since the background is further away from the image capturing apparatus than the object in addition to the night, a large difference in brightness occurs between the object and the background. Therefore, the first pixel data having a relatively small brightness value is more likely to be data of the background, and thus the first pixel data forming the first image data stored in the first image data storage unit at the same pixel position as that where the first pixel data is stored is updated. Therefore, the first pixel data makes it possible to easily generate captured image data of the background.

Twelfth Aspect

According to a twelfth aspect of the invention, in the image capturing apparatus according to the eleventh aspect, preferably, when a brightness value indicating the pixel value of the first pixel data is larger than the predetermined threshold value, the first image data generating unit determines that the first pixel data is unavailable, and does not update the first image data stored in the first image data storage unit.

According to the above-mentioned structure, for example, for a subject including a moving object and a background in the night, when a brightness value indicating first pixel data corresponding to the charge read from pixels of the entire exposure region by the first reading unit is larger than a predetermined brightness value, the first pixel data can be determined to be unavailable, and the first image data cannot be updated.

That is, since the background is further away from the image capturing apparatus than the object in addition to the night, a large difference in brightness occurs between the object and the background. Therefore, the first pixel data having a relatively large brightness value is more likely to be data of the object. Thus, in this case, the first image data stored in the first image data storage unit is not updated, which makes it possible to reduce the number of processes required to generate the first image data.

Thirteenth Aspect

According to a thirteenth aspect of the invention, in the image capturing apparatus according to any one of the third to twelfth aspects, preferably, the captured image data generating unit reads the second image data from the second image data storage unit, reads the first image data corresponding to regions other than the specific region from the first image data storage unit, and combines the read second image data with the read first image data to generate the captured image data.

According to the above-mentioned structure, image data of a specific region and image data obtained by subtracting the image data of the specific region from the first image data can be read in synchronization with various synchronization signals from an output device, such as a display device, and these image data can be combined with each other to generate a captured image.

Fourteenth Aspect

According to a fourteenth aspect of the invention, there is provided an image capturing method that is used in an image capturing element including a photoelectric converter that has a plurality of photoelectric conversion elements arranged in a matrix each of which converts light into charge and stores the converted charge and an electric shutter function of controlling exposure time for each frame. The method includes: reading charge exposed for a predetermined exposure time from each pixel formed by the photoelectric conversion element in the entire exposure region of the photoelectric converter by a destructive readout method; and reading charge from each pixel formed by the photoelectric conversion element in a specific region, which is a portion of the entire exposure region of the photoelectric converter, plural times by a non-destructive readout method in a period in which the charge is read from the entire exposure region.

According to the above-mentioned structure, it is possible to obtain the same operations and effects as those in the image capturing element according to the first aspect.

Fifteenth Aspect

According to a fifteenth aspect of the invention, there is provided an image capturing method that is used in an image capturing apparatus including a photoelectric converter that has a plurality of photoelectric conversion elements arranged in a matrix each of which converts light into charge and stores the converted charge and an electric shutter function of controlling exposure time for each frame. The method includes: reading charge exposed for a predetermined exposure time from each pixel formed by the photoelectric conversion element in the entire exposure region of the photoelectric converter by a destructive readout method; reading charge from each pixel formed by the photoelectric conversion element in a specific region, which is a portion of the entire exposure region of the photoelectric converter, plural times by a non-destructive readout method in a period in which the charge is read from the entire exposure region; generating first image data on the basis of first pixel data composed of the charge that is read from the entire exposure region by exposure for a predetermined exposure time; storing the generated first image data; generating second image data on the basis of plural types of second pixel data composed of charges that are read from the specific region by exposure for different exposure times; storing the generated second image data; and combining the stored second image data and the stored first image data to generate captured image data.

According to the above-mentioned structure, it is possible to obtain the same operations and effects as those in the image capturing apparatus according to the second aspect.

Sixteenth Aspect

According to a sixteenth aspect of the invention, an image capturing system having an electric shutter function of controlling exposure time for each frame includes: a photoelectric converter that has a plurality of photoelectric conversion elements arranged in a matrix each of which converts light into charge and stores the converted charge; a first reading unit that reads charge exposed for a predetermined exposure time from each pixel formed by the photoelectric conversion element in the entire exposure region of the photoelectric converter by a destructive readout method; a second reading unit that reads charge from each pixel formed by the photoelectric conversion element in a specific region, which is a portion of the entire exposure region of the photoelectric converter, plural times by a non-destructive readout method in a period in which the first reading unit reads the charge from the entire exposure region; a first image data generating unit that generates first image data on the basis of first pixel data composed of the charge that is read by the first reading unit from the entire exposure region by exposure for a predetermined exposure time; a first image data storage unit that stores the first image data generated by the first image data generating unit; a second image data generating unit that generates second image data on the basis of plural types of second pixel data composed of charges that are read by the second reading unit from the specific region by exposure for different exposure times; a second image data storage unit that stores the second image data generated by the second image data generating unit; and a captured image data generating unit that combines the stored second image data and the stored, first image data to generate captured image data.

According to the above-mentioned structure, it is possible to obtain the same operations and effects as those in the image capturing apparatus according to the second aspect.

In this aspect, the image capturing system may be composed of a single apparatus, a terminal, or other apparatuses (in this case, similar to the first aspect), or it may be composed of a network system in which a plurality of apparatus, terminals, or other apparatus are connected so as to communicate with each other. In the latter case, components may belong to any of the plurality of apparatuses as long as they can be connected so as to communicate with each other.

Seventeenth Aspect

According to a seventeenth aspect of the invention, an image processing apparatus includes: a first image data generating unit that generates first image data, on the basis of first pixel data composed of charge that is read from pixels formed by photoelectric conversion elements in the entire exposure region of a photoelectric converter by exposure for a predetermined exposure time by a destructive readout method, the photoelectric conversion elements being arranged in a matrix and each converting light into charge and storing the charge; a first image data storage unit that stores the first image data generated by the first image data generating unit; a second image data generating unit that generates second image data on the basis of plural types of second pixel data composed of charges that are read from each pixel formed by the photoelectric conversion element in a specific region, which is a portion of the entire exposure region of the photoelectric converter, plural times by a non-destructive readout method in a period in which the first reading unit reads the charge; a second image data storage unit that stores the second image data generated by the second image data generating unit; and a captured image generating unit that combines the stored second image data and the stored first image data to generate captured image data.

According to the above-mentioned structure, the first image data generating unit can generate first image data, on the basis of first pixel data composed of charge that is read from pixels formed by photoelectric conversion elements in the entire exposure region of a photoelectric converter by exposure for a predetermined exposure time by a destructive readout method. The photoelectric conversion elements are arranged in a matrix, and each of the photoelectric conversion elements converts light into charge and stores the charge. The first image data storage unit can store the first image data generated by the first image data generating unit.

The second image data generating unit can generate second image data on the basis of plural types of second pixel data composed of charges that are read from pixels formed by the photoelectric conversion elements in a specific region, which is a portion of the entire exposure region of the photoelectric converter, plural times by a non-destructive readout method in a period in which the first reading unit reads the charge. The second image data storage unit can store the second image data generated by the second image data generating unit.

Further, the captured image data generating unit can combine the stored second image data with the stored first image data to generate captured image data.

In this way, similar to the image capturing apparatus according to the second aspect, it is possible to combine the background image (the image of the entire exposure region) that is exposed for a sufficient amount of time with the image of the specific region including a moving object that is exposed in multiple states. As a result, it is possible to obtain an image having the object and the background with high contrast and to accurately capture the image of a moving object.

BRIEF DESCRIPTION OF THE DRAWINGS

The invention will be described with reference to the accompanying drawings, wherein like numbers reference like elements.

FIG. 9A is a diagram illustrating a change in charge stored in a high-brightness pixel in a destructive readout method.

FIG. 9B is a diagram illustrating a change in charge stored in a low-brightness pixel in the destructive readout method.

DESCRIPTION OF EXEMPLARY EMBODIMENTS

Hereinafter, an image capturing apparatus according to an exemplary embodiment of the invention will be described with reference to the accompanying drawings. FIGS. 1 to 15 are diagrams illustrating an image capturing apparatus 1 according to an embodiment of the invention.

The image capturing apparatus 1 includes an image capture processing system provided with an image capturing element having a function of capturing an image by exposing the entire exposure region (the entire scanning region) of a sensor cell array for a normal exposure time (time arbitrarily set by, for example, a user) in one frame period (first exposure time) and of capturing an image by exposing a specific exposure region (a portion of the exposure region) of the sensor cell array for plural kinds of exposure times in one frame period. That is, image signals are read from the specific region plural times at higher speed than that at which image signals are read when the specific region is exposed for the normal exposure time. Therefore, photoelectrically converted image signals are sequentially output to pixels. In this embodiment, in the image capturing apparatus 1, a region in which a moving picture exists and a peripheral region thereof are referred to as a movement region (for example, the movement region is arbitrarily set by a user), and a region of the sensor cell for capturing the image of the movement region is referred to as the specific region. In the following description, the specific region is referred to as the movement region.

Figure 1:
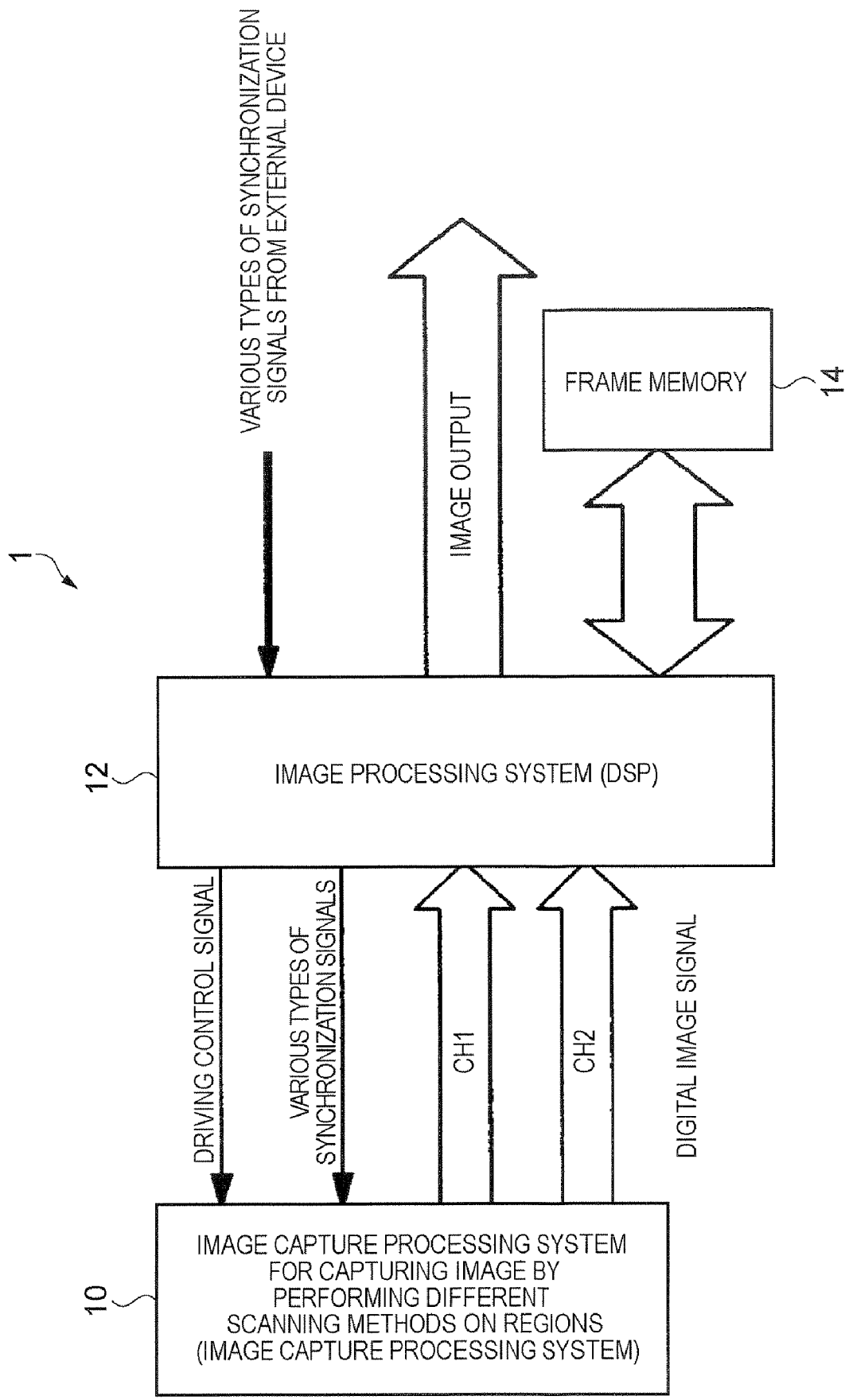
FIG. 1 is a block diagram schematically illustrating the structure of an image capturing apparatus 1 according to an embodiment of the invention.

Next, the schematic structure of the image capturing apparatus 1 according to this embodiment of the invention will be described with reference to FIG. 1. FIG. 1 is a block diagram schematically illustrating the structure of the image capturing apparatus 1 according to the embodiment of the invention.

As shown in FIG. 1, the image capturing apparatus 1 includes: an image capture processing system 10 for capturing an image by performing different scanning methods on regions (hereinafter, referred to as an image capture processing system 10) that reads pixel signals in a destructive readout method from lines of pixels exposed in the entire exposure area of a sensor cell array 56 for the normal exposure time in an exposure period, reads various types of image signals in a non-destructive readout method from each line of pixels exposed in the movement region for plural kinds of exposure times (in this embodiment, which are shorter than the normal exposure time and do not overlap each other), and sequentially outputs pixel data (digital data) of the pixel signals read out from the lines of pixels; an image processing system 12 that generates a background image, on the basis of the image data that is output from the image capture processing system 10 for capturing an image by performing different scanning methods on regions and corresponds to the exposure of the pixels in the entire exposure region for the normal exposure time, generates the image of the movement region (hereinafter, referred to as a movement region image), on the basis of pixel data corresponding to the exposure of the pixels in the specific region for the plural kinds of exposure times, and combines the generated background image and the movement region image to generate a captured image; and a frame memory 14 that stores various types of image data, such as movement region image data, movement region background image data, and background image data.

Figure 2:
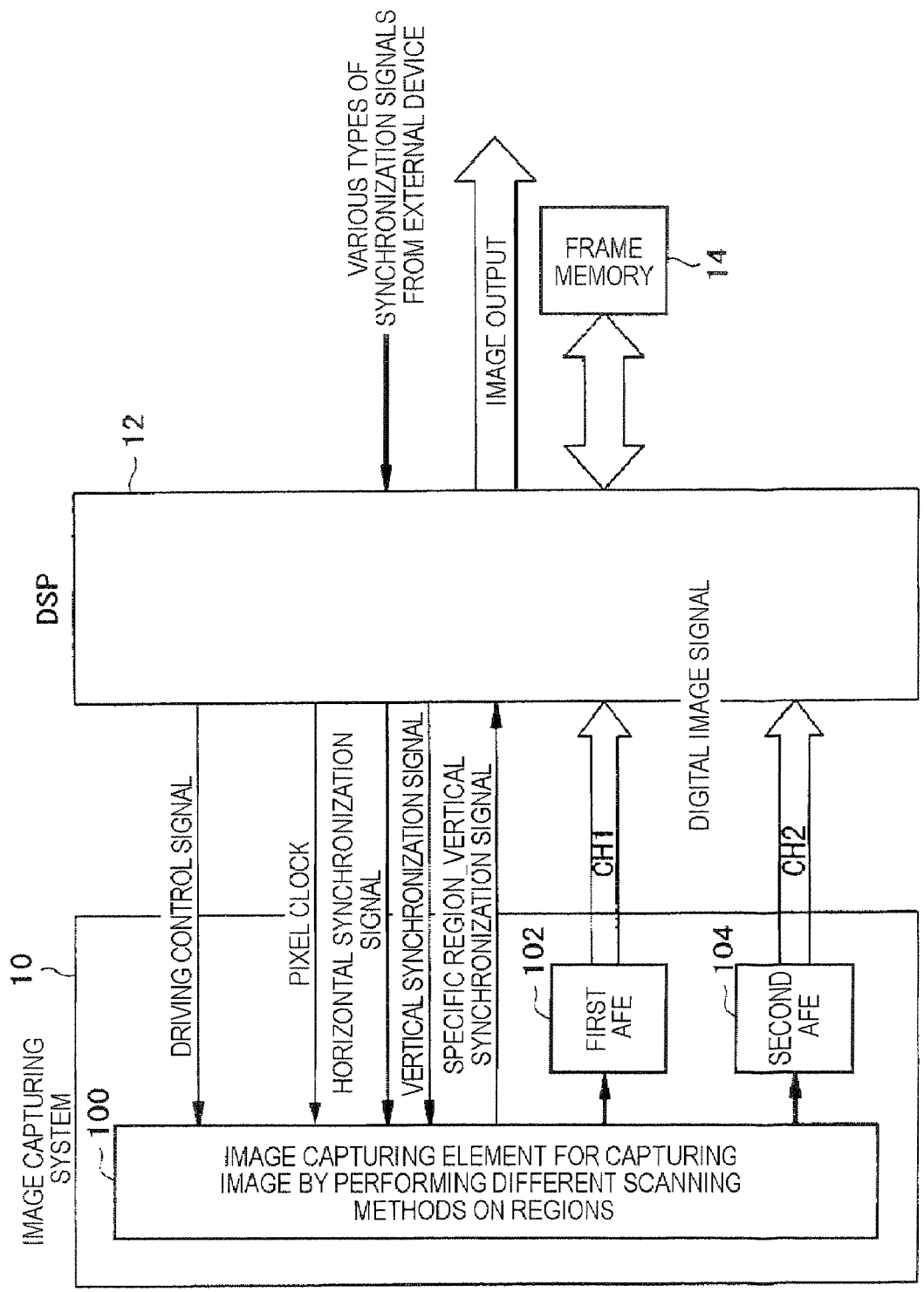
FIG. 2 is a block diagram illustrating the internal structure of an image capture processing system 10.
Figure 3:
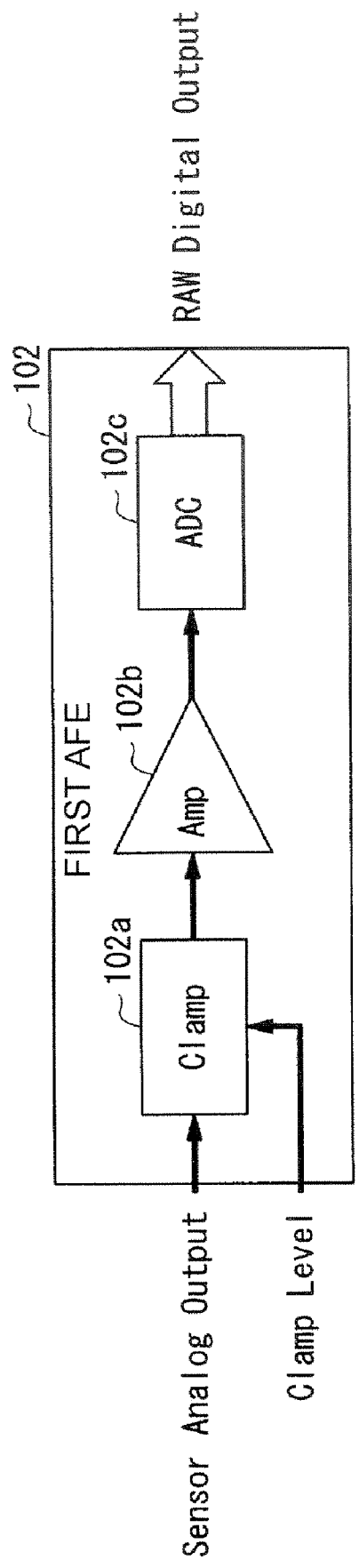
FIG. 3 is a diagram illustrating the internal structure of a first analog front end (AFE) 102.
Figure 4:
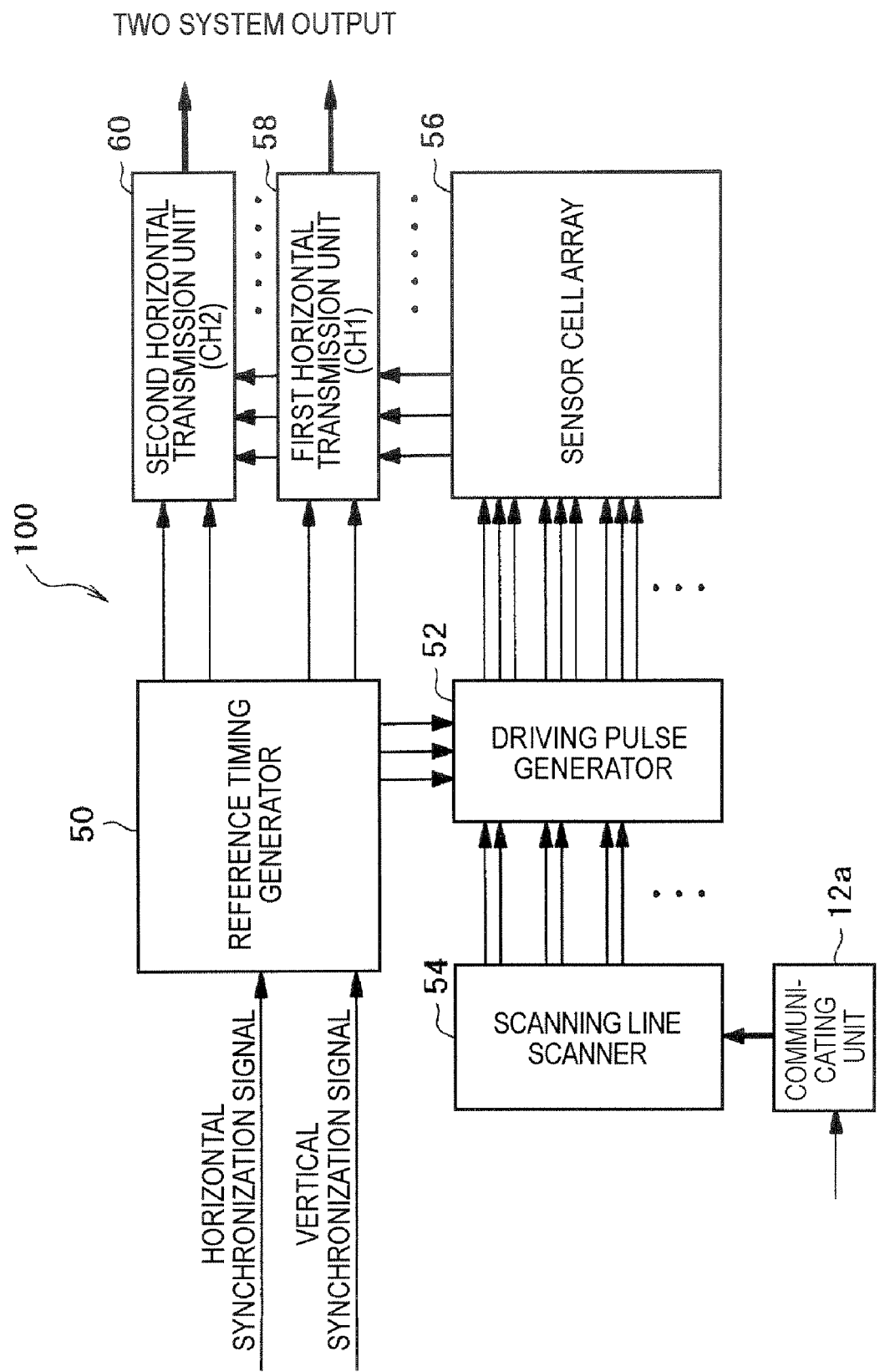
FIG. 4 is a block diagram illustrating the internal structure of an image capturing element 100 for capturing an image by performing different scanning methods on regions.
Figure 5:
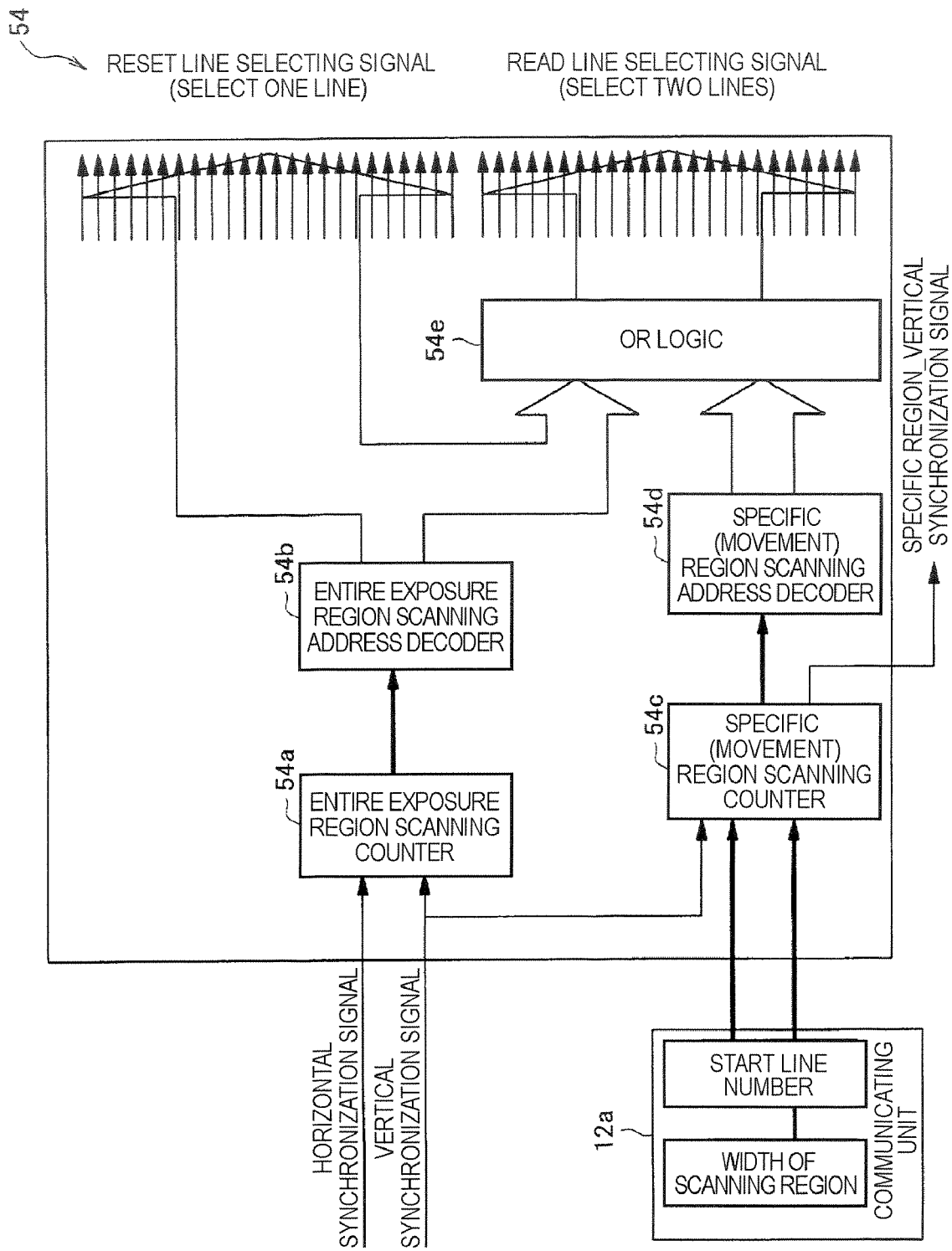
FIG. 5 is a diagram illustrating the internal structure of a scanning line scanner 54.

Next, the internal structure of the image capture processing system 10 will be described with reference to FIGS. 2 to 5. FIG. 2 is a block diagram illustrating the internal structure of the image capture processing system 10. FIG. 3 is a diagram illustrating the internal structure of a first analog front end (AFE) 102. FIG. 4 is a block diagram illustrating the internal structure of an image capturing element 100 for capturing an image by performing different scanning methods on regions. FIG. 5 is a diagram illustrating the internal structure of a scanning line scanner 54.

As shown in FIG. 2, the image capture processing system 10 includes the image capturing element 100 for capturing an image by performing different scanning methods on regions, the first AFE 102, and a second AFE 104.

The image capturing element 100 for capturing an image by performing different scanning methods on regions (hereinafter, referred to as an image capturing element 100) uses an image capturing lens (not shown) to condense light from a subject on the sensor cell array 56 (which will be described later), and stores charges corresponding to the condensed amount of light to each pixel of the sensor cell array 56. The image capturing element 100 sequentially converts charge groups stored in each column of pixels of the entire exposure region of the sensor cell array 56 into voltage groups on the basis of driving signals (a pixel clock, a horizontal synchronization signal, and a vertical synchronization signal) output from a timing controller 12b (which will be described later) of the image processing system 12. In addition, the image capturing element 100 sequentially converts charge groups stored in each column of pixels in the movement region of the sensor cell array 56 into voltage groups on the basis of a specific region_vertical synchronization signal generated by the scanning line scanner 54 (which will be described later). Voltage groups obtained by converting the charge groups exposed to the movement region for plural types of exposure times are sequentially output to the first AFE 102 through a first output channel (hereinafter, referred to as a first channel CH1) that is composed of a first line memory and is included in a first horizontal transmission unit 58 (which will be described later), and voltage groups obtained by converting the charge groups exposed to the entire exposure region for the normal exposure times are sequentially output to the second AFE 104 through a second output channel (hereinafter, referred to as a second channel CH2) that is composed of a second line memory S and a second line memory N and is included in a second horizontal transmission unit 60 (which will be described later). In this embodiment, charge is read out from each pixel through the second channel CH2 in the non-destructive readout method in the entire exposure region, and charge is read out from each pixel through the first channel CH1 in the non-destructive readout method in the specific (movement) region. In this way, the charge group when exposure is performed in the entire exposure region for the normal exposure time and the charge group when exposure is performed in the movement region for plural types of exposure times are independently read out in the first exposure period (normal exposure time) by an electronic shutter function.

Next, the difference in operation between the destructive readout method and the non-destructive readout method will be described below. In the destructive readout method, a reset process (which clears the charge stored in the sensor cell array) is performed immediately after a reading process and then the reading process is performed again. A read signal (analog signal) before the reset process is stored in the second line memory S, and a read signal after the reset process is stored in the second line memory N. Then, a differential amplifying circuit 62 (which will be described later) performs an arithmetic process on a corresponding pixel signal to detect a signal level and remove noise. On the other hand, in the non-destructive readout method, the reset process is not performed after the reading process. The signal (analog data) after the reading process is stored in the first line memory. The pixel signals stored in the first line memory and the second line memory are output to the first AFE 102 and the second AFE 104, respectively, in synchronization with the pixel clock.

The first AFE 102 and the second AFE 104 convert voltage signals (analog data) corresponding to different exposure times that are respectively output through the first channel CH1 of the first horizontal transmission unit 58 and the second channel CH2 of the second horizontal transmission unit 60 into digital data (hereinafter, referred to as pixel data). Then, the first AFE 102 and the second AFE 104 output the converted pixel data to a high-speed scanning image generator 12c (which will be described later) and a background pixel determining/updating unit 12e (which will be described later) of the image processing system 12, respectively.

Next, the internal structure of the first AFE 102 will be described with reference to FIG. 3.

As shown in FIG. 3, the first AFE 102 includes a clamp circuit 102a, an amplifying circuit 102b, and an A/D converting circuit 102c.

The clamp circuit 102a receives a pixel signal from the image capturing element 100, and determines whether the received pixel signal is a signal for a shielding region. When it is determined that the pixel signal is for the shielding region, the clamp circuit 102a performs a clamping process on all input signals such that the signal level thereof becomes a black (reference) level, and outputs the clamped pixel signal to the amplifying circuit 102b.

The amplifying circuit 102b amplifies the clamped pixel signal so as to match with an input range of an A/D converter, and outputs the amplified pixel signal to the A/D converting circuit 102c.

The A/D converting circuit 102c converts the pixel signal (analog data) received from the amplifying circuit 102b into pixel data (digital data) and outputs the digital data to the image processing system 12.

The first AFE 102 and the second AFE 104 have the same internal structure, and thus a description of the internal structure of the second AFE 104 will be omitted.

Next, the internal structure of the image capturing element 100 will be described with reference to FIG. 4.

As shown in FIG. 4, the image capturing element 100 includes a reference timing generator 50, a driving pulse generator 52, the scanning line scanner 54, the sensor cell array 56, the first horizontal transmission unit 58, and the second horizontal transmission unit 60.

The reference timing generator 50 generates a reference timing signal on the basis of the vertical synchronization signal and the horizontal synchronization signal transmitted from the timing controller 12b (which will be described later) of the image processing system 12.

The driving pulse generator 52 generates a driving pulse on the basis of the reference timing signal output from the reference timing generator 50, and a reset line selecting signal and a read line selecting signal output from the scanning line scanner 54, and supplies the generated driving pulse to the sensor cell array 56.

The scanning line scanner 54 selects the position of a reset line corresponding to the entire exposure region on the basis of various driving control signals for designating the width of a scanning region and a start line number from a communicating unit 12a (which will be described later) of the image processing system 12 to generate the reset line selecting signal. In addition, the scanning line scanner 54 selects the positions of read lines corresponding to the specific region (movement region) and the entire exposure region to generate read line selecting signals (corresponding to two lines) and outputs the generated selecting signals to the driving pulse generator 52.

The pixels of the sensor cell array 56 are formed by a CMOS technique. The sensor cell array 56 exposes the pixels in the entire exposure region for the normal exposure time on the basis of the driving pulse supplied from the driving pulse generator 52, reads out the charge stored in each pixel by exposure from each line of pixels in the destructive readout method, and sequentially outputs the read charges to the second horizontal transmission unit 60. Meanwhile, in the exposure period of the normal exposure time, the sensor cell array 56 sequentially reads the charge stored in each pixel in the specific (movement) region at plural types of exposure times from each line of pixels for every type of exposure time in the non-destructive readout method, and sequentially outputs the read charges to the first horizontal transmission unit 58.

The first horizontal transmission unit 58 stores pixel signal data corresponding to the plural types of exposure times in the specific (movement) region of the sensor cell array 56 in the first line memory of the first channel CH1 for each line of pixels, and outputs the stored pixel signal data to the first AFE 102.

The second horizontal transmission unit 60 stores pixel signal data (data immediately before reset) corresponding to the normal exposure time in the entire exposure region of the sensor cell array 56 and pixel signal data immediately after the reset in the second line memory S and the second line memory N of the second channel CH2 for each line of pixels, respectively, and outputs the stored pixel signal data corresponding to the normal exposure time and the stored pixel signal data immediately after the reset to the second AFE 104 through the differential amplifying circuit 62.

Next, the internal structure of the scanning line scanner 54 will be described with reference to FIG. 5.

As shown in FIG. 5, the scanning line scanner 54 includes an entire exposure region scanning counter 54a, an entire exposure region scanning address decoder 54b, a specific (movement) region scanning counter 54c, a specific region scanning address decoder 54d, and an OR logic 54e.

The entire exposure region scanning counter 54a repeatedly performs a count-up operation on the basis of the vertical synchronization signal and the horizontal synchronization signal output from the reference timing generator 50. The value of the counter corresponds to line numbers of the pixels in the entire exposure region, and the line numbers are output to the entire exposure region scanning address decoder 54b.

The entire exposure region scanning address decoder 54b makes the line corresponding to the line number output from the entire exposure region scanning counter 54a available as a 'read line', and makes the other lines unavailable. In addition, the entire exposure region scanning address decoder 54b outputs a read line control signal indicating an available line position (address) to the OR logic 54e, and also outputs the read line control signal to the driving pulse generator 52 as a reset line selecting signal.

The specific (movement) region scanning counter 54c repeatedly performs a count-up operation in asynchronism with the entire exposure region scanning counter 54a on the basis of a start line number and the width of a scanning region from the communicating unit 12a. The value of the counter corresponds to line numbers of the pixels in the specific (movement) region, and the line numbers are output to the specific (movement) region scanning address decoder 54d.

The specific (movement) region scanning counter 54c generates a specific region_vertical synchronization signal, which is a vertical synchronization signal in a specific region, and outputs the generated specific region_vertical synchronization signal to the timing control unit 12b of the image processing system 12.

The specific (movement) region scanning address decoder 54d makes the line corresponding to the line number output from the specific (movement) region scanning counter 54a available as a 'read line', and makes the other lines unavailable. In addition, the specific (movement) region scanning address decoder 54d outputs a read line control signal indicating an available line position (address) to the OR logic 54e.

The OR logic 54e performs an OR operation on each line on the basis of the read line control signal output from the entire exposure region scanning address decoder 54b and the read line control signal output from the specific (movement) region scanning address decoder 54d to generate a final read line selecting signal for the entire exposure region and a final read line selecting signal for the specific (movement) region. The generated read line selecting signals are output to the driving pulse generator 52.

Figure 6:
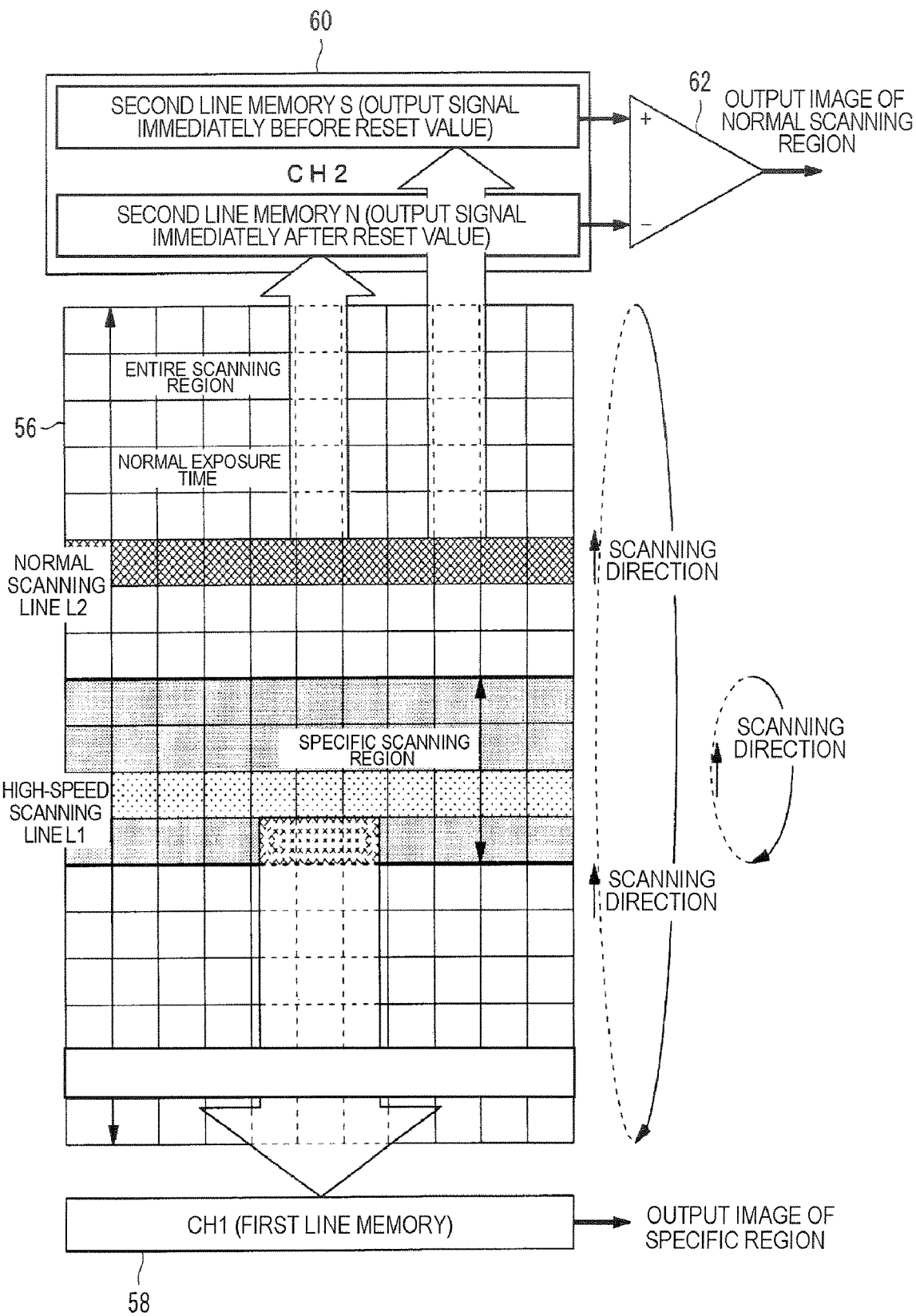
FIG. 6 is a diagram illustrating an example of a process of exposing each line of pixels of a sensor cell array 56 of the image capturing element 100 and a process of reading pixel signals from each line of pixels.

Next, a method of controlling the exposure time of the image capturing element 100 and a method of reading pixel signals from the sensor cell array 56 will be described with reference to FIG. 6. FIG. 6 is a diagram illustrating an example of the operation of the sensor cell array 56 of the image capturing element 100 exposing each line of pixels and reading out pixel signals.

In the method of controlling the exposure time according to this embodiment, a normal scanning line (read line) L2 for clearing (resetting) the charge stored in each line of pixels in the entire exposure region (entire scanning region) of the sensor cell array 56 and reading the pixel signal at the normal exposure time is set, and a high-speed scanning line (read line) L1 for performing non-destructive reading on the pixel signals at plural types of exposure times from the specific (movement) region (specific scanning region) of the sensor cell array 56 is set. Then, in the first exposure period (normal exposure time), a process of reading and resetting pixel signals at the normal exposure time and a process of reading pixel signals in a non-destructive readout method at plural types of exposure times are independently performed. That is, as shown in FIG. 6, when charges corresponding to the normal exposure time are sequentially stored in lines of pixels (for example, first to eighteenth lines of pixels) in the entire exposure region, the normal scanning line L2 is set such that pixel signals of each line of pixels are sequentially read out and the stored charges are sequentially cleared. Meanwhile, the high-speed scanning line L1 is set such that pixel signals of each line of pixels are sequentially read out in a non-destructive readout method in each of the plural types of exposure times in the period where the charge corresponding to the normal exposure time is stored, in lines of pixels (for example, ninth to twelfth lines of pixels) in the specific region.

In this embodiment, as shown in FIG. 6, the pixel signal (analog data) for the entire exposure region at the normal exposure time is read to the second line memory S of the second channel CH2. Meanwhile, the pixel signal immediately after reset is read to the second line memory N of the second channel CH2. As shown in FIG. 6, the read pixel signals are output to the differential amplifying circuit 62 provided on the output side of the second horizontal transmission unit 60. Then, the differential amplifying circuit 62 performs a subtraction operation on the pixel signals before and after the reset to detect a signal level and remove noise. Then, the pixel signals having been operated are output to the second AFE 104, and the second AFE 104 converts the pixel signals into digital data (pixel data). On the other hand, the pixel signals for the specific (movement) region at plural types of exposure times are read to the first line memory of the first channel CH1, and are output to the first AFE 102. Then, the first AFE 102 converts the pixel signals into digital data (pixel data).

In the method of controlling reading timing of pixel signals from the normal scanning line L2 and the high-speed scanning line L1, as shown in FIG. 6, the normal scanning line L2 is sequentially scanned on the entire exposure region for every line of pixels (in the upward direction in FIG. 6), and in the normal scanning line L2, charge is cleared (reset), and pixel signals are read out from the pixels that have been exposed for the normal exposure time immediately after the stored charge is cleared (reset). Then, in the first line, the reading and resetting of the pixel signals are performed, and after the pixel signals are completely read from the line memory to the outside, the scanning of the normal scanning line L2 is sequentially executed. When the normal scanning line L2 reaches the first line again, the scanning of the normal scanning line L2 is performed immediately after the normal exposure time elapses. In this sequence, the reading of pixel signals at the normal exposure and the clearing (resetting) of stored charge are sequentially performed on each line of pixels in the entire region of the sensor cell array. Meanwhile, in the specific (movement) region, when the stored charge is cleared (reset) by the normal scanning line L2, the non-destructive reading of the pixel signals from the pixels that are exposed for each of the plural types of exposure times in the high-speed scanning line L1 is sequentially performed on the cleared pixel lines in ascending order of exposure time. In this sequence, the non-destructive reading of pixel signals is sequentially performed on lines of pixels that have been exposed for each of the plural types of exposure times in the specific region of the sensor cell array.

In this embodiment, when the reading of the pixel signals from the normal scanning line L2 is butted to the reading of the pixel signals from the high-speed scanning line L1 (for example, when the reading of the pixel signals from the normal scanning line L2 and the reading of the pixel signals from the high-speed scanning line L1 are performed at the normal exposure time), the following method is used to avoid the butting: the read period set by the horizontal synchronization signal is divided into two periods, the pixel signals are read to the second line memory of the second channel CH2 by the normal scanning line L2 in one of the two periods, and the pixel signals are read to the first line memory of the first channel CH1 by the high-speed scanning line L2 in the other period.

Figure 7:
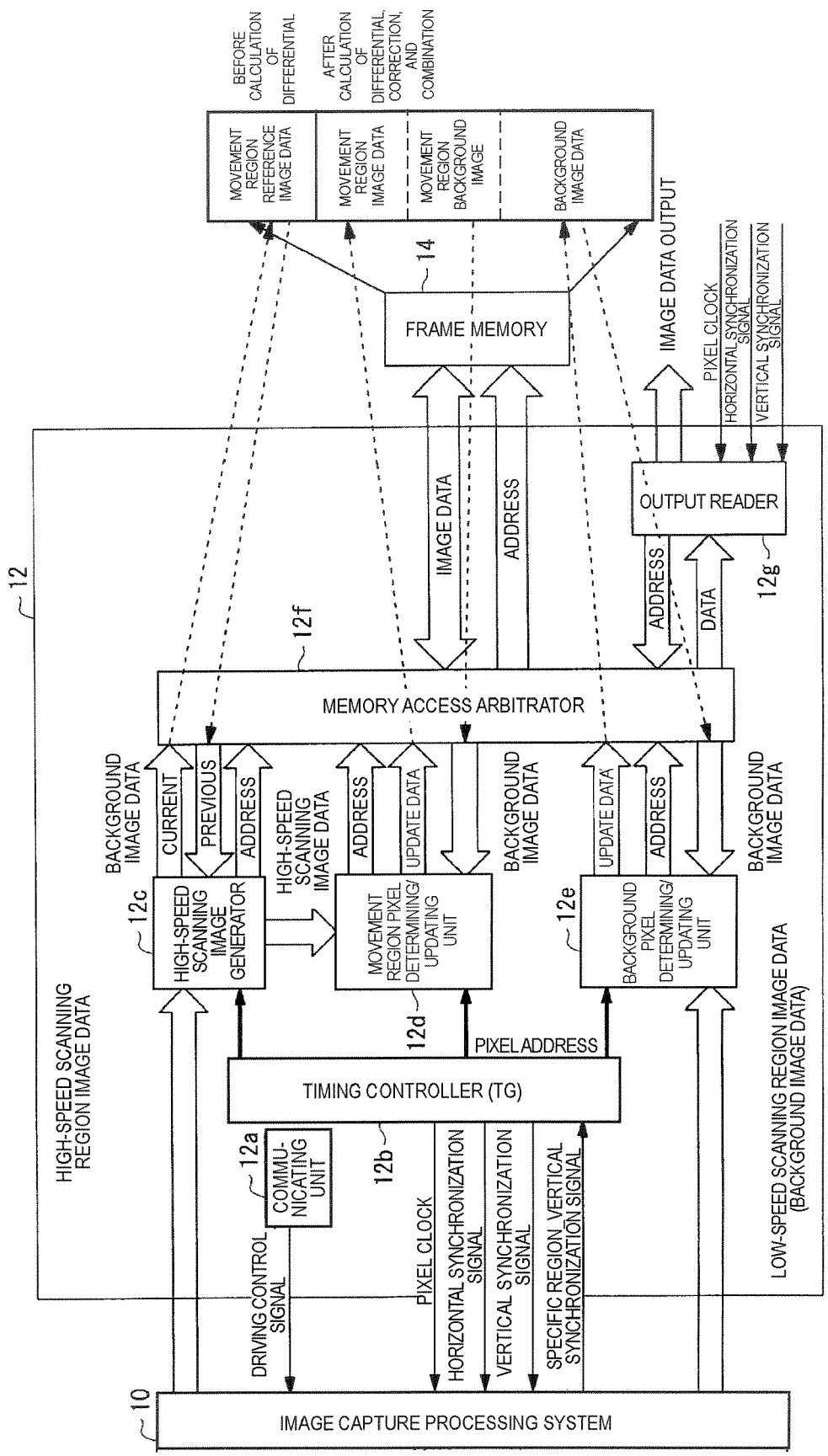
FIG. 7 is a block diagram illustrating the internal structure of an image processing system 12.
Figure 8A:
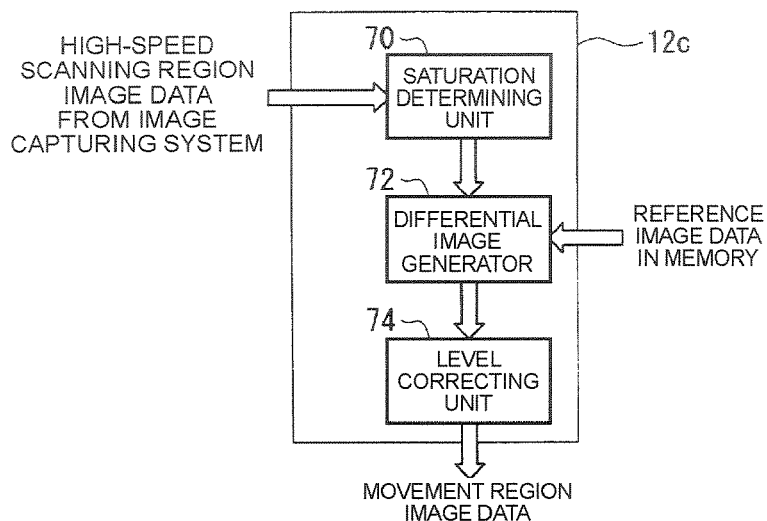
FIG. 8A is a diagram illustrating the internal structure of a high-speed scanning image generator 12c.
Figure 8B:
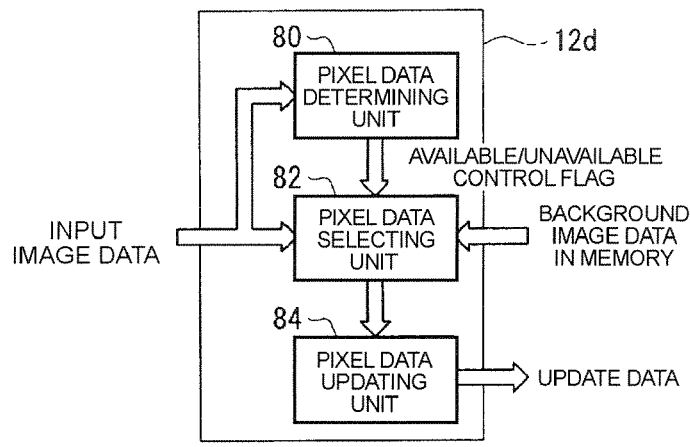
FIG. 8B is a diagram illustrating the internal structure of a movement region pixel determining/updating unit 12d.
Figure 8C:
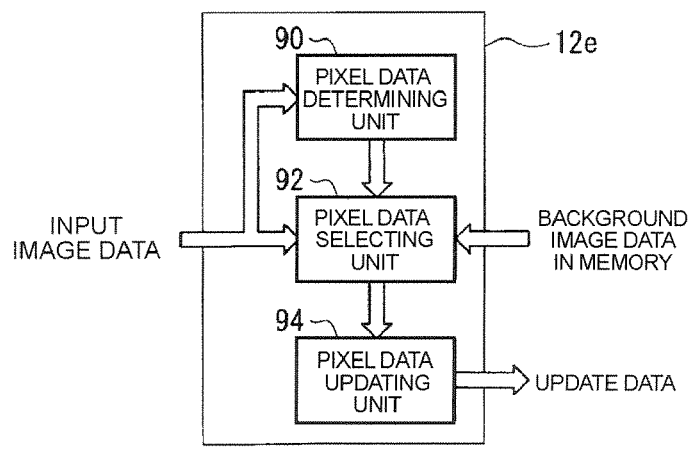
FIG. 8C is a diagram illustrating the internal structure of a background pixel determining/updating unit 12e.

Next, the internal structure of the image processing system 12 will be described with reference to FIGS. 7 to 9B. FIG. 7 is a block diagram illustrating the internal structure of the image processing system 12. FIG. 8A is a diagram illustrating the internal structure of the high-speed scanning image generator 12*c*, FIG. 8B is a diagram illustrating the internal structure of a movement region pixel determining/updating unit 12*d*, and FIG. 8C is a diagram illustrating the internal structure of the background pixel determining/updating unit 12*e*. FIG. 9A is a diagram illustrating a change in the charge stored in a high-brightness pixel in the destructive readout method, and FIG. 9B is a diagram illustrating a change in the charge stored in a low-brightness pixel in the destructive readout method.

As shown in FIG. 7, the image processing system 12 includes the communicating unit 12*a*, the timing controller 12*b*, the high-speed scanning image generator 12*c*, the movement region pixel determining/updating unit 12*d*, the background pixel determining/updating unit 12*e*, a memory access arbitrator 12*f*, and an output reader 12*g*.

The communicating unit 12*a* acquires information on the width of a scanning region and a start line number for a specific (movement) region of the sensor cell array 56 from an external system controller (not shown), and outputs driving control signals indicating the acquired start line number and the width of the scanning region to the scanning line scanner 54 of the image capture processing system 10.

The timing controller 12*b* generates driving signals for the image capturing element 100 (for example, a pixel clock, a horizontal synchronization signal, and a vertical synchronization signal) and outputs the generated driving signals to the reference timing generator 50 of the image capturing element 100. In addition, since the pixel position (a pixel column (line) number and a pixel number) of the pixel signal output from the second channel CH2 of the image capture processing system 10 in the sensor cell array 56 of the image capturing element 100 is known from the horizontal synchronization signal and the vertical synchronization signal, the timing controller 12*b* generates the pixel column (line) number (hereinafter, referred to as address information), and outputs the address information to the background pixel determining/updating unit 12*e*. Further, since the pixel position of the pixel signal output from the first channel CH1 of the image capture processing system 10 in the sensor cell array 56 of the image capturing element 100 is known from the specific region_vertical synchronization signal output from the image capture processing system 10, the timing controller 12*b* generates address information and outputs the address information to the movement region pixel determining/updating unit 12*d*.

As shown in FIG. 8A, the high-speed scanning image generator 12*c* includes a saturation image determining unit 70, a differential image generating unit 72, and a level correcting unit 74.

When the brightness value of pixel data (hereinafter, referred to as reference pixel data) of a movement region, which is raw data before correction that has been acquired at the previous exposure time, is equal to or larger than a predetermined threshold value, the saturation image determining unit 70 determines that the generation of an image in the movement region is unavailable and thus does not generate an image in the movement region. On the other hand, when the brightness value is smaller than the predetermined threshold value, the saturation image determining unit 70 determines that the generation of an image in the movement region is available and thus generates an image in the movement region. The predetermined threshold value means a saturation level, and a pixel whose brightness is higher than the saturation level is unavailable (which will be described in detail later). In addition, the saturation image determining unit 70 stores reference image data (raw data) of the movement region that is composed of the reference pixel data in the frame memory 14.

The differential image generating unit 72 acquires pixel data of pixel signals corresponding to plural types of exposure times that have been scanned and read by the high-speed scanning line L1 in the image capture processing system 10 through the first channel CH1 and acquires the reference pixel data stored in the frame memory 14 that corresponds to positional information (address) of the acquired pixel data through the memory access arbitrator 12f. Then, the differential image generating unit 72 generates pixel data (hereinafter, referred to as high-speed scanning pixel data) of the movement region from the difference between the acquired pixel data and the reference pixel data. The high-speed scanning pixel data generated from the difference makes it possible to remove fixed pattern noise caused by a variation in the characteristics of pixels.

Next, a change in the charge stored in each pixel of the sensor cell array 56 will be described with reference to FIGS. 9A and 9B in order to explain the operation of the differential image generating unit 72.

As shown in FIGS. 9A and 9B, in the exposure of one frame (normal exposure time), the charge stored in each pixel of the sensor cell array 56 increases over time. In the movement region, the charge is read out from each pixel in the non-destructive readout method. Therefore, even when the reading of charge is performed several times during exposure, the charge stored in each pixel is maintained. FIG. 9A shows an increase in the value of a high-brightness pixel, and FIG. 9B shows an increase in the background region of a low-brightness pixel. That is, in FIG. 9A, the quantity of light of a subject is larger than that of a subject in FIG. 9B, and the increase rate of charge stored in a pixel FIG. 9A is higher than that in FIG. 9B. The background region is determined as a moving pixel from the difference between the increase rates. The reset timing shown in FIGS. 9A and 9B is timing when the charge stored in the sensor cell array 56 is cleared, and the timing determines the normal exposure time.

For example, charge is read from the movement region at the timings (1) to (5) shown in FIG. 9A and an image is generated from the difference between charges, as described above. That is, an image is generated from the difference between the charges read out at the timings (3) to (5) subsequent to the timing (2) and the charges read out at the previous timings (2) to (4). In order for this process to be performed, the pixel values of image data of the movement (high-speed scanning) region are stored in the frame memory (this is referred t as reference pixel data). The generation of an image using the difference between charges means that an image is generated at a frame rate that is five times the normal frame rate, and this means that an image having one fifth of the exposure time is generated.

The level correcting unit 74 corrects the difference between brightness levels due to the difference between the exposure time of pixel data of the entire exposure region (background image) and the exposure time of high-speed scanning pixel data of the movement region. That is, as described above, since the high-speed scanning pixel data is equivalent to the image having one fifth of the exposure time that is composed of a differential value between pixel data of two continuous sampling (exposure) times, the brightness level of each differential value is one fifth of the brightness level at the normal exposure time. Therefore, a level correcting process of increasing the brightness level of the high-speed scanning pixel data by five times is performed.

As shown in FIG. 8B, the movement region pixel determining/updating unit 12d includes a pixel data determining unit 80, a pixel data selecting unit 82, and a pixel data updating unit 84.

The pixel data determining unit 80 acquires high-speed scanning pixel data from the high-speed scanning image generator 12c, and determines whether a brightness value indicating the high-speed scanning pixel data is equal to or larger than a predetermined threshold value. When it is determined that the brightness value is equal to or larger than the predetermined threshold value, the pixel data determining unit 80 makes the high-speed scanning pixel data 'available'. On the other hand, when it is determined that the brightness value is smaller than the predetermined threshold value, the pixel data determining unit 80 makes the high-speed scanning pixel data 'unavailable'. That is, when the brightness value is smaller than the predetermined threshold value, the background region is determined from the high-speed scanning pixel data. The 'available' or 'unavailable' flag information is input to the pixel data selecting unit 82.

The pixel data selecting unit 82 acquires through the memory access arbitrator 12f the 'available' or 'unavailable' flag information from the pixel data determining unit 80, the high-speed scanning pixel data from the high-speed scanning image generator 12c, and the pixel data (hereinafter, referred to as background pixel data) of the background image data stored in the frame memory 14 that corresponds (is disposed at the same pixel position of) to an address of the high-speed scanning pixel data. When the flag information is 'available', the pixel data selecting unit 82 selects the high-speed scanning pixel data from the acquired background pixel data and high-speed scanning pixel data, and generates update data from the selected pixel data. On the other hand, when the flag information is 'unavailable', the pixel data selecting unit 82 selects the background pixel data from the acquired background pixel data and high-speed scanning pixel data, and generates update data from the selected pixel data. The generated update data is input to the pixel data updating unit 84.

The pixel data updating unit 84 gives the memory access arbitrator 12f a writing instruction to write the update data acquired from the pixel data selecting unit 82 and updates pixel data at the same address position as the update data in the movement region image data stored in the frame memory 14.

As shown in FIG. 8C, the background pixel determining/updating unit 12e includes a pixel data determining unit 90, a pixel data selecting unit 92, and a pixel data updating unit 94.

The pixel data determining unit 90 acquires the background pixel data (pixel data of pixel signals read by the normal scanning line L2) from the image capture processing system 10 through the second channel CH2, and determines whether a brightness value indicating the background pixel data is equal to or smaller than a predetermined threshold value. When it is determined that the brightness value is equal to or smaller than the predetermined threshold value, the pixel data determining unit 90 makes the background pixel data 'available'. On the other hand, when it is determined that the brightness value is larger than the predetermined threshold value, the pixel data determining unit 90 makes the background pixel data 'unavailable'. That is, when the brightness value is larger than the predetermined threshold value, the movement region is determined from the background pixel data. The 'available' or 'unavailable' flag information is input to the pixel data selecting unit 92.

The pixel data selecting unit 92 acquires through the memory access arbitrator 12f the 'available' or 'unavailable' flag information from the pixel data determining unit 90, the background pixel data (new) from the image capture processing system 10, and the pixel data (hereinafter, referred to as old background pixel data) of the background image data stored in the frame memory 14 that corresponds (is disposed at the same pixel position of) to an address of the background pixel data. When the flag information is 'available', the pixel data selecting unit 92 selects the background pixel data (new) acquired from the image capture processing system 10 from the acquired background pixel data, and generates update data from the selected pixel data. On the other hand, when the flag information is 'unavailable', the pixel data selecting unit 92 selects the old background pixel data acquired from the frame memory 14 from the acquired background pixel data, and generates update data from the selected pixel data. In this way, only the background image is continuously maintained. The generated update data is input to the pixel data updating unit 94.

The pixel data updating unit 94 gives the memory access arbitrator 12f a writing instruction to write the update data acquired from the pixel data selecting unit 92 and updates pixel data at the same address position as the update data in the background image data stored in the frame memory 14.

Referring to FIG. 7 again, the memory access arbitrator 12f arbitrates access requests of the background pixel determining/updating unit 12e, the high-speed scanning image generator 12c, the movement region pixel determining/updating unit 12d, and the output reader 12g to the image data stored in the frame memory to perform access to the frame memory 14 according to instructions from the background pixel determining/updating unit 12e, the high-speed scanning image generator 12c, the movement region pixel determining/updating unit 12d, and the output reader 12g to read/write data from/to the frame memory 14.

The output reader 12g reads image data stored in the frame memory 14 through the memory access arbitrator 12f in synchronization with output timing from an external output (display) device, and outputs the read image data to an output device.

As shown in FIG. 7, the frame memory 14 is a memory for storing various types of image data, such as movement region reference image data, movement region image data, movement region background image data, and background image data. When the frame memory 14 receives a read request from the memory access arbitrator 12f, the frame memory 14 reads out pixel data indicated by the read request. In addition, when receiving a write request from the memory access arbitrator 12f, the frame memory 14 writes pixel data indicated by the write request.

Figure 10:
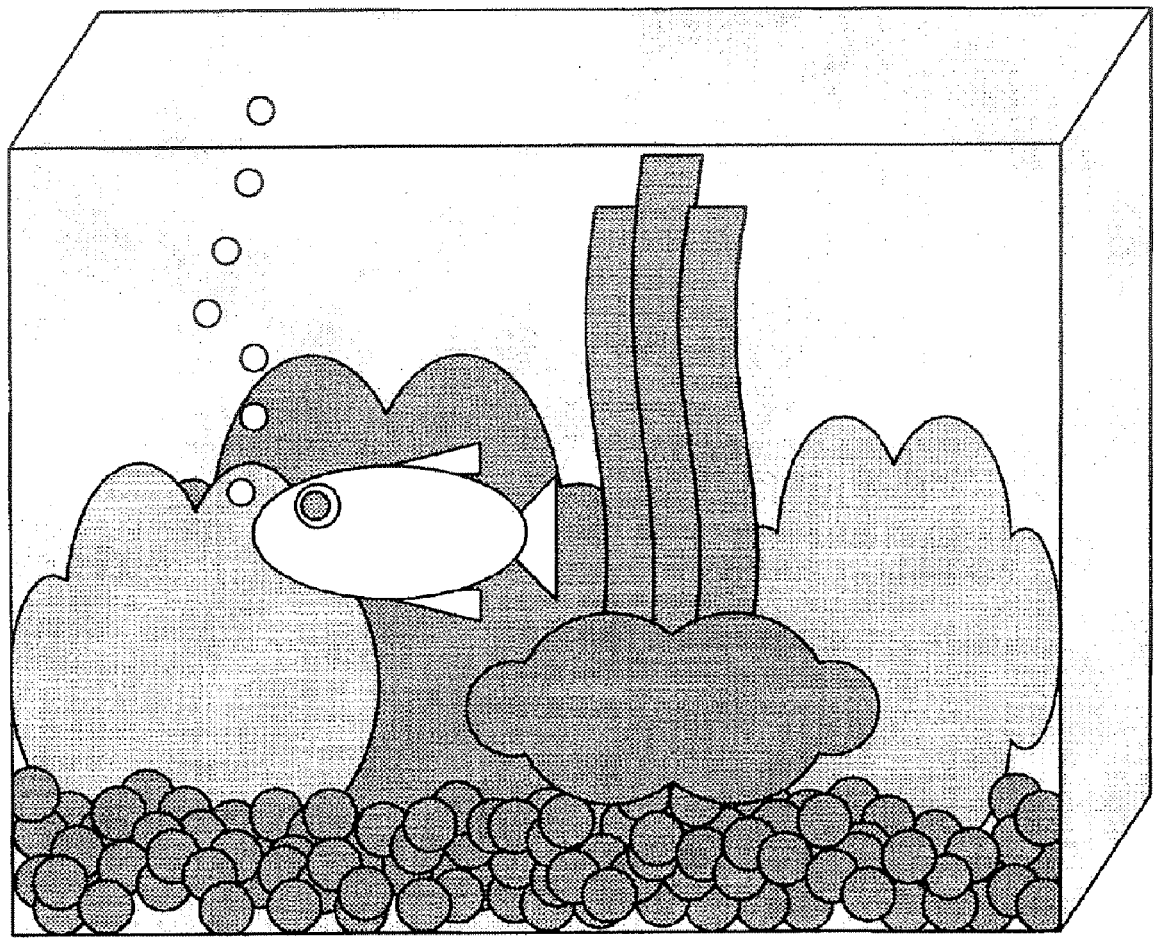
FIG. 10 is a diagram illustrating an example of a subject to be photographed.
Figure 11:
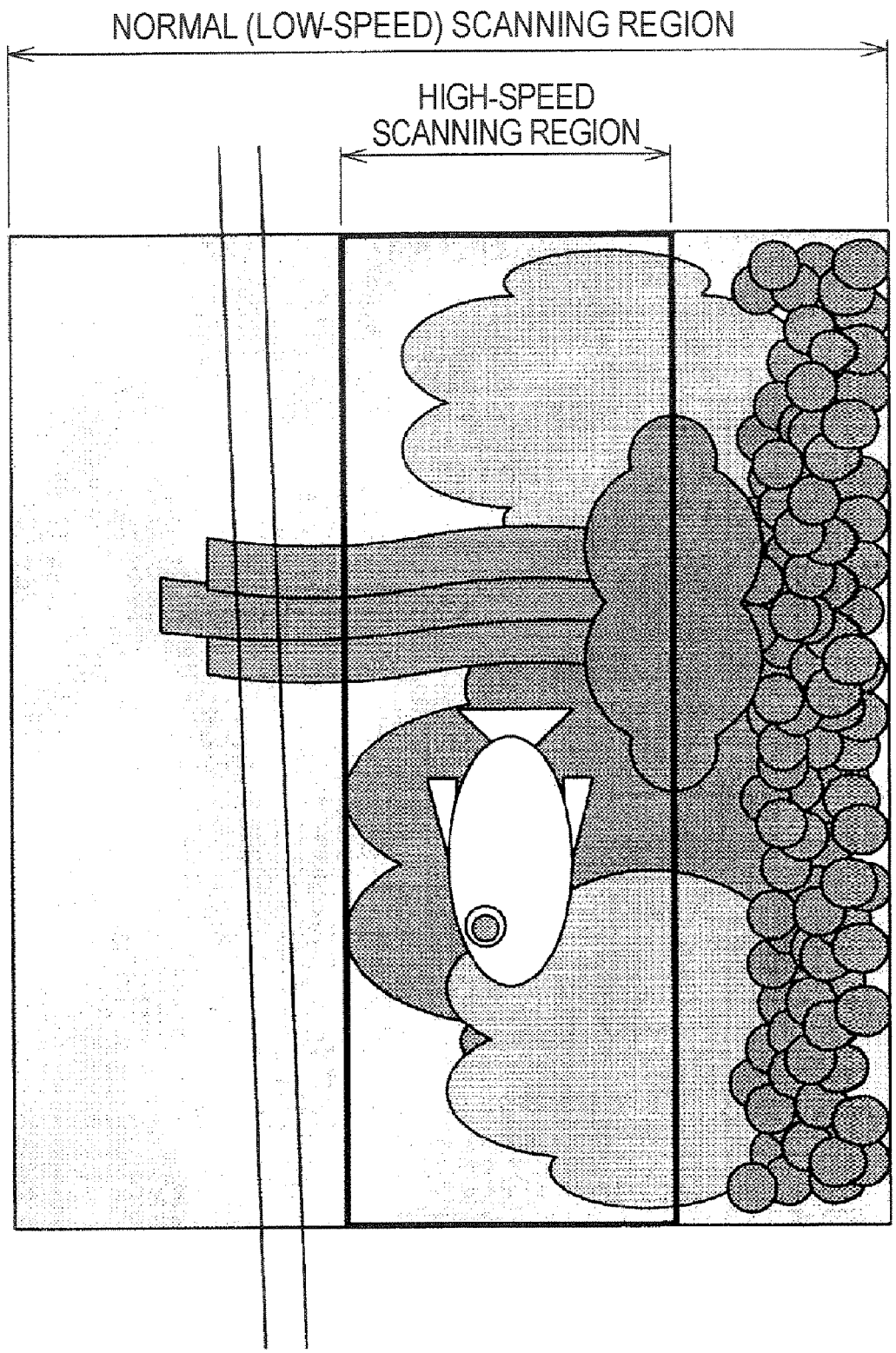
FIG. 11 is a diagram illustrating a normal scanning region (the entire exposure region) and a high-speed scanning region (movement region) in a captured image.
Figure 12:
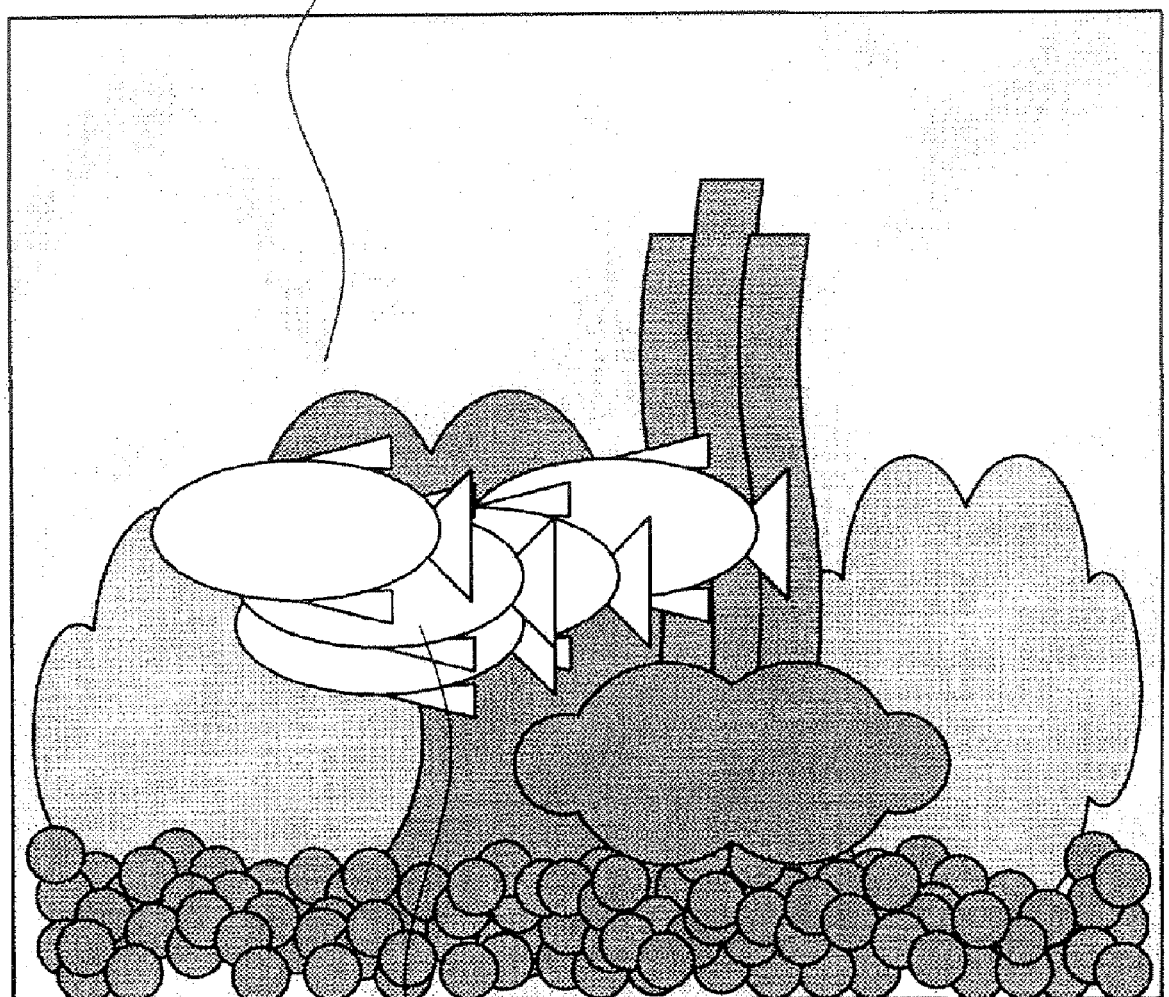
FIG. 12 is a diagram illustrating an example of an image in the normal scanning region that is obtained by exposure for a normal exposure time.
Figure 13:
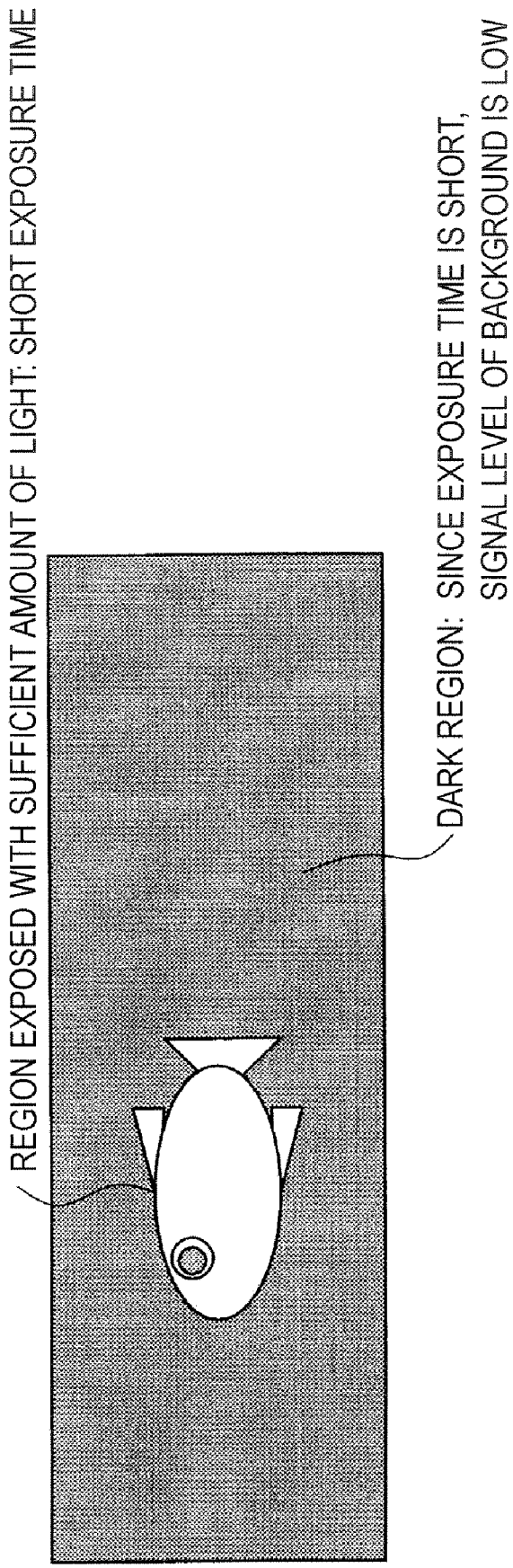
FIG. 13 is a diagram illustrating an example of an image in the high-speed scanning region that is obtained by exposure for a short exposure time.
Figure 14A:
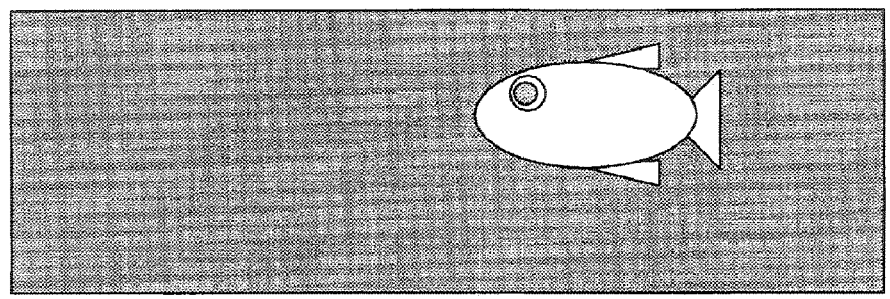
FIGS. 14A to 14E are diagrams illustrating examples of images in the high-speed scanning region that are obtained by exposure for plural types of exposure times and are composed of high-speed scanning pixel data obtained by a differential process.
Figure 14B:
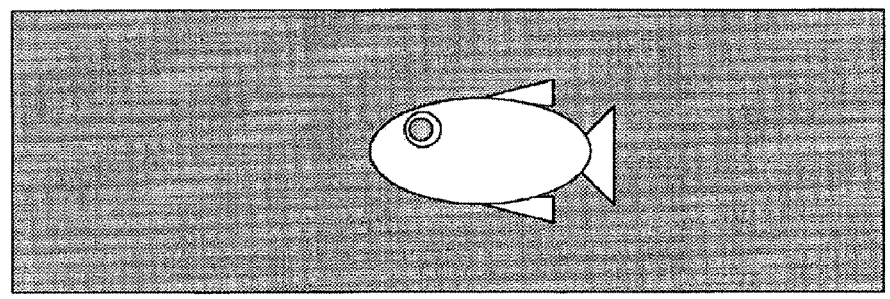
Figure 14C:
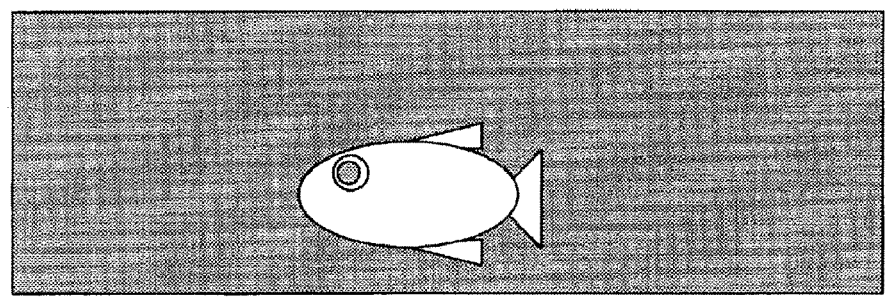
Figure 14D:
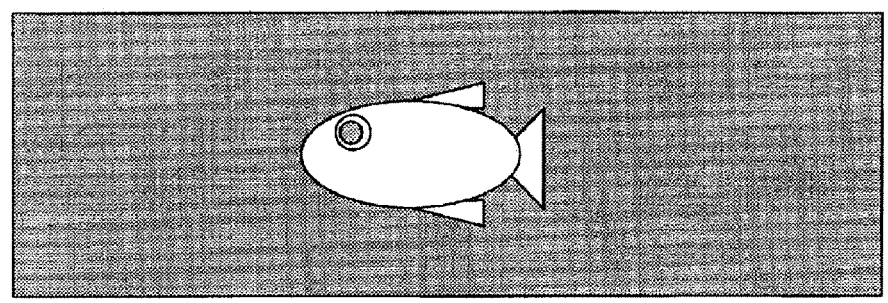
Figure 14E:
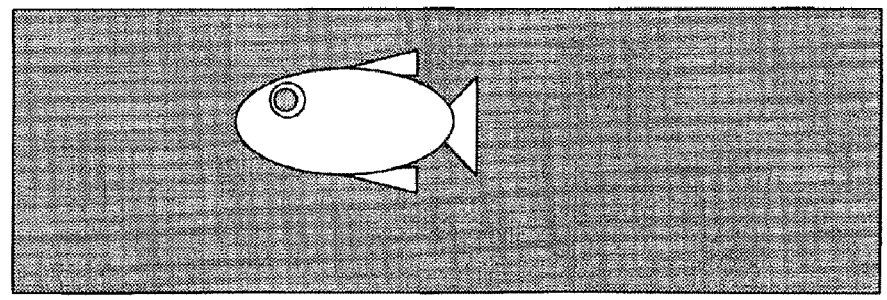
Figure 15:
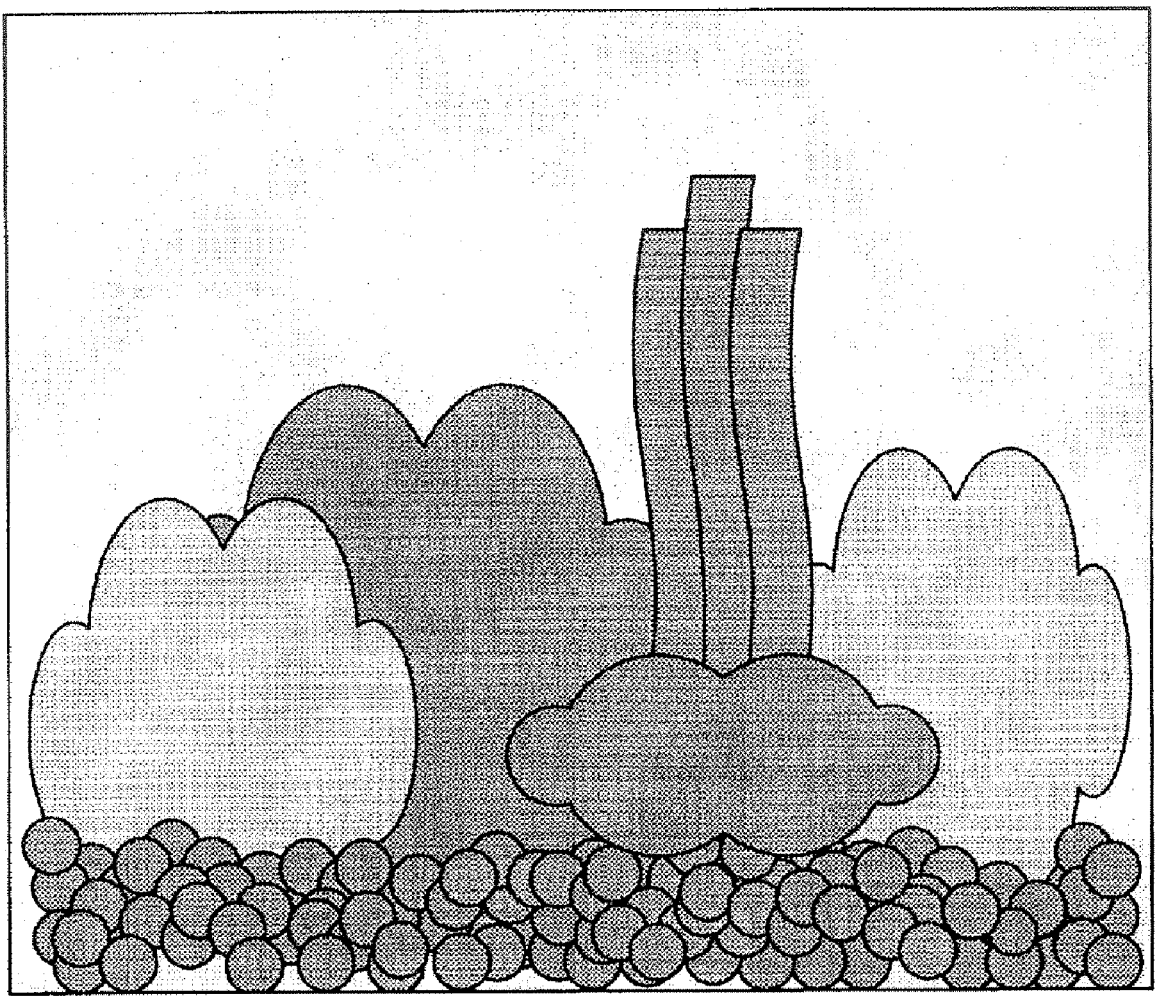
FIG. 15 is a diagram illustrating an example of a final background image.

Next, the actual operation of the image capturing apparatus 1 will be described with reference to FIGS. 10 to 15. FIG. 10 is a diagram illustrating an example of an object to be photographed. FIG. 11 is a diagram illustrating a normal scanning region (entire exposure region) and a high-speed scanning region (movement region) of the object to be photographed. FIG. 12 is a diagram illustrating an example of the image of the normal scanning region obtained by exposure for the normal exposure time. FIG. 13 is a diagram illustrating an example of the image of the high-speed scanning region obtained by exposure for a short exposure time. FIGS. 14A to 14E are diagrams illustrating examples of images in the high-speed scanning region that are obtained by exposure for plural types of exposure times and are composed of high-speed scanning pixel data obtained by a differential process. FIG. 15 is a diagram illustrating an example of a final background image.

Next, the operation of the image capturing apparatus 1 capturing the image of a water tank having a fish, a water plant, and gravel therein, which is shown in FIG. 10, will be described below. In FIG. 10, a fish is a moving subject, and objects other than the fish are the background. Therefore, first, a peripheral region including a region where the fish, which is a subject, exists needs to be set as a movement region. For example, as shown in FIG. 11, a rectangular region including a region where the fish exists and a peripheral region is set as a movement region with respect to the entire exposure region of the sensor cell array 56. That is, as shown in FIG. 11, the entire exposure region of the sensor cell array 56 is a normal scanning region that is exposed for the normal exposure time, and the set movement region is a high-speed scanning region. Further, in this embodiment, similar to the sampling timings (1) to (5) shown in FIG. 9A, the normal exposure time is equally divided into five sampling timings of the high-speed scanning region. Since the background other than the fish in the subject is dark, the time required to sufficiently expose the background other than the fish is set as the normal exposure time. When the range of the movement region, the sampling time in the movement region, and the normal exposure time are set in this way, information on the range of the movement region, the sampling time in the movement region, and the normal exposure time is transmitted to the image capturing apparatus 1 through an external host system.

In the image capturing apparatus 1, when power is turned on and the image processing system 12 acquires information on the width of a scanning region and a start line number of the movement region and information on the exposure time from the external host system, the communication unit 12a transmits driving control signals indicating the width of the scanning region and the start line number of the movement region to the image capture processing system 10. The timing controller 12b outputs driving signals (a pixel clock, a horizontal synchronization signal, and a vertical synchronization signal) for driving the image capturing element to obtain pixel signals of the entire exposure region at the normal exposure time to the image capture processing system 10.

When the image capture processing system 10 receives the driving control signal, the scanning line scanner 54 generates a reset line selecting signal and a read line control signal for the entire exposure region in synchronization with the vertical synchronization signal and the horizontal synchronization signal. In addition, the scanning line scanner 54 generates a read line control signal for the movement region on the basis of the start line number, the width of the scanning region, and the horizontal synchronization signal. Then, the scanning line scanner 54 inputs the generated read control signal to the OR logic 54e to generate the read line selecting signals for the entire exposure region and the movement region. The generated reset line selecting signal and read line selecting signals (two types of signals) are output to the driving pulse generator 52. The driving pulse generator 52 generates driving pulses on the basis of the reference timing signal from the reference timing generator and various types of selection signals from the scanning line scanner 54, and supplies the driving pulses to the sensor cell array 56.

The sensor cell array 56 scans the normal scanning line L2 and the high-speed scanning line L1 on the basis of the driving pulse from the driving pulse generator 52 to read the charge stored by exposure for the normal exposure time from each line of pixels in the entire exposure region by the destructive readout method (to clear the stored charge). Independently from the destructive readout operation, the non-destructive readout operation is performed, and causes the charge stored by exposure for plural types of exposure times to be read from each line of pixels in the movement region. The pixel signal composed of the charge read by the scanning of the high-speed scanning line L1 is output to the first AFE 102 through the first channel CH1 of the first horizontal transmission unit 58, and the pixel signal composed of the charge read by the scanning of the normal scanning line L2 is output to the second AFE 104 through the second channel CH2 of the second horizontal transmission unit 60.

The first AFE 102 converts the pixel signals (analog data) corresponding to the charge stored by exposure for the plural types of exposure times that are sequentially output through the first channel CH1 into digital data to generate pixel data and outputs the pixel data to the image processing system 12. Meanwhile, the second AFE 104 converts the pixel signals (analog data) corresponding to the charge stored by exposure for the normal exposure time that are sequentially output through the second channel CH2 into digital data to generate pixel data and outputs the pixel data to the image processing system 12.

In the image processing system 12, the pixel data of the movement region output from the first AFE 102 is input to the high-speed scanning image generator 12c, and the pixel data of the entire exposure region output from the second AFE 104 is input to the background pixel determining/updating unit 12e.

In the high-speed scanning image generator 12c, when acquiring the high-speed scanning pixel data corresponding to each of the plural types of exposure time through the first channel CH1, the saturation image determining unit 70 determines whether the brightness value of the high-speed scanning pixel data is equal to or larger than a predetermined threshold value (a saturation value). When the brightness value is equal to or larger than the predetermined threshold value, the saturation image determining unit 70 determines that the generation of the image of the movement region is unavailable, and does not generate the image of the movement region. On the other hand, when the brightness value is smaller than the predetermined threshold value, the saturation image determining unit 70 determines that the generation of the image of the movement region is available, and generates the image of the movement region.

Meanwhile, when reference pixel data corresponding to any one of the plural types of exposure times is stored in the frame memory 14 and a brightness value indicating the reference pixel data is equal to or smaller than a predetermined threshold value, the differential image generator 72 acquires reference pixel data stored in the frame memory 14 that corresponds to the positional information (address) of the acquired pixel data and generates high-speed scanning pixel data from a differential value between the acquired pixel data and the acquired reference pixel data.

The level correcting unit 74 corrects the brightness levels of all of the generated high-speed scanning pixel data. In this embodiment, since the normal exposure time is divided into five exposure times and the high-speed scanning pixel data is generated from the differential value, a level correcting process of increasing the brightness level of the high-speed scanning pixel data by five times is performed.

The high-speed scanning pixel data whose level has been corrected is output to the movement region pixel determining/updating unit 12d.

In the movement region pixel determining/updating unit 12d, when acquiring the high-speed scanning pixel data from the high-speed scanning image generator 12c, the pixel data determining unit 80 determines whether a brightness value indicating the acquired high-speed scanning pixel data is equal to or larger than a predetermined threshold value. When it is determined that the brightness value is equal to or larger than the predetermined threshold value, the pixel data determining unit 80 makes the high-speed scanning pixel data 'available'. On the other hand, when it is determined that the brightness value is smaller than the predetermined threshold value, the pixel data determining unit 80 makes the high-speed scanning pixel data 'unavailable'. Meanwhile, the pixel data selecting unit 82 acquires through the memory access arbitrator 12f the background pixel data obtained by exposure for the normal exposure time that is stored in the frame memory 14 and corresponds (is disposed at the same pixel position of) to an address of the high-speed scanning pixel data acquired from the high-speed scanning image generator 12c. When it is determined that the acquired high-speed scanning pixel data is 'available', the pixel data selecting unit 82 selects the high-speed scanning pixel data from the acquired background pixel data and high-speed scanning pixel data, and generates update data from the selected pixel data. As shown in FIG. 13, in the movement region, although exposure time is short, the subject having high brightness is exposed with a relatively large amount of light, but the low-brightness background has an insufficiently high brightness level due to short exposure time and thus appears to be dark. Therefore, when the high-speed scanning pixel data is equal to or larger than the predetermined threshold value, the pixel data is more likely to be pixel data of the subject. In this case, the high-speed scanning pixel data that has been determined to be 'available' is used to generate update data, and the pixel data updating unit 84 uses the update data to update pixel data at a pixel position corresponding to the movement region image data stored in the frame memory 14.

In the movement region, a differential process sequentially generates high-speed scanning pixel data from the pixel data corresponding to five types of exposure times that are sequentially acquired through the first channel CH1. When a subject moves, the positions of the subject are different from each other in the differential images corresponding to five types of exposure times, as shown in FIGS. 14A to 14E. That is, in this embodiment, when exposure is performed for exposure time shorter than then normal exposure time, pixel data having a frame rate higher than a normal frame rate can be obtained. That is, it is possible to obtain an image following a subject moving at high speed.

On the other hand, when it is determined that the acquired high-speed scanning pixel data is 'unavailable', the pixel data selecting unit 82 selects the background pixel data from the acquired background pixel data and high-speed scanning pixel data, and generates update data from the selected pixel data. As shown in FIG. 13, in the movement region, since the background other than the subject is a low-brightness portion and thus appears to be dark, the brightness value of the high-speed scanning pixel data is likely to be smaller than a predetermined brightness value in the background. Therefore, in this case, the background pixel data that has been determined to be 'unavailable' and exposed for the normal exposure time is used to generate update data, and the pixel data updating unit 84 uses the update data to update pixel data at a pixel position corresponding to the movement region image data stored in the frame memory 14.

When the high-speed scanning pixel data has a high brightness value, the high-speed scanning pixel data is used to generate the update data. On the other hand, when the high-speed scanning pixel data has a low brightness value, the background pixel data having the same pixel position as the high-speed scanning pixel data is used to generate the update data. The generated update data is used to update the pixel data of the movement region image data. In this way, it is possible to generate movement region image data in which the image of a subject is composed of pixel data read from the movement region by high-speed scanning, and the image of the background other than the subject is composed of pixel data read from the entire exposure region by normal scanning.

In the background pixel determining/updating unit 12e, when acquiring the background pixel data through the second channel CH2, the pixel data determining unit 90 determines whether a brightness value indicating the acquired background pixel data is equal to or smaller than a predetermined threshold value. When it is determined that the brightness value is equal to or smaller than the predetermined threshold value, the pixel data determining unit 90 makes the background pixel data 'available'. On the other hand, when it is determined that the brightness value is larger than the predetermined threshold value, the pixel data determining unit 90 makes the background pixel data 'unavailable'. Meanwhile, the pixel data selecting unit 92 acquires through the memory access arbitrator 12f the background pixel data from the image capture processing system 10 and old background pixel data corresponding to (is disposed at the same pixel position of) an address of the background pixel data that is stored in the frame memory 14. When flag information from the pixel data determining unit 90 is 'available', the pixel data selecting unit 92 selects the background pixel data acquired from the image capture processing system 10, and generates update data from the selected pixel data. As shown in FIG. 12, in the entire exposure region, since exposure time is long, a bright subject (target) has a high brightness value, but the background has a brightness value smaller than the subject. That is, when the brightness value of the background pixel data is smaller than the predetermined brightness value, the pixel data is more likely to be pixel data of the background. Therefore, in this case, the background pixel data that has been determined to be 'available' and acquired by the image capture processing system 10 is used to generate update data, and the pixel data updating unit 94 uses the update data to update pixel data at a pixel position corresponding to the background image data stored in the frame memory 14.

On the other hand, when the flag information is 'unavailable', the pixel data selecting unit 92 selects the old background pixel data acquired from the frame memory 14, not the background pixel data acquired from the image capture processing system 10, and generates update data from the selected pixel data. That is, as shown in FIG. 12, when the brightness value of the background pixel data is larger than a predetermined brightness value, the pixel data is more likely to be pixel data of the subject (target). Therefore, in this case, the background pixel data that has been determined to be 'unavailable' and acquired by the image capture processing system 10 is used to generate update data, and the pixel data updating unit 94 uses the update data to update pixel data at a pixel position corresponding to the background image data stored in the frame memory 14.

As such, when the background pixel data has a low brightness value, the background pixel data is used to generate update data. On the other hand, when the background pixel data has a high brightness value, old background pixel data stored in the frame memory 14 at the same pixel position as the background pixel data is used to generate update data. The generated update data is used to update each pixel data of the background image data. Finally, as shown in FIG. 15, it is possible to obtain a background image without a subject that is exposed for the normal exposure time.

The process of generating the high-speed scanning pixel data, the process of updating the movement region image data, and the process of updating the background image data are repeatedly performed to form background image data and image data of a movement region of each frame in the frame memory 14.

The output reader 12g reads the background image data and the image data of the movement region formed in the frame memory 14 through the memory access arbitrator 12f in synchronization with output timing from an external output (display) device, and outputs the read image data to the output device. More specifically, the output reader 12g counts an address number of image data to be read on the basis of the pixel clock, the horizontal synchronization signal and the vertical synchronization signal from the output device. When the address number is a background image data number, the output reader 12g sequentially reads the background image data stored in the frame memory 14 for every line of pixels and outputs the read image data to the output device. When the address number is a movement region image data number, the output reader 12g sequentially reads the movement region image data stored in the frame memory 14 for every line of pixels and outputs the read image data to the output device. In this way, it is possible to output an image obtained by combining background image data composed of pixel data that is obtained by normal scanning (exposure for the normal exposure time) with movement region image data composed of pixel data that is obtained by high-speed scanning (exposure for plural types of exposure times).

Therefore, in the image capturing apparatus 1 according to this embodiment of the invention, one image capturing element exposes the background of a subject for the normal exposure time to capture the image of the background by means of a destructive readout method. During the normal exposure time, a region where a moving subject exists and a peripheral region thereof are regarded as a movement region, and the image capturing element exposes the movement region for plural types of exposure times to capture the image of the movement region by means of a non-destructive readout method. Then, the captured background image and the captured image of the movement region are combined to generate the image of the subject. That is, pixel data associated with the movement of a subject is acquired by high-speed scanning, and pixel data for a dark background that is exposed for a sufficient amount of time is acquired by normal scanning. These acquired pixel data are combined to generate a captured image. Therefore, it is possible to recognize both the content of a subject that moves against a dark background and the content of the background at the same time and to obtain a clear image having high contrast.

In this embodiment, the charge reading process of the reference timing generator 50, the scanning line scanner 54, the driving pulse generator 52, and the first horizontal transmission unit 58 of the image capturing element 100 for capturing an image by performing different scanning methods on regions in the image capture processing system 10 from the entire exposure region of the sensor cell array 56 corresponds to a first reading unit according to any one of the first, second, ninth, tenth, eleventh, twelfth, sixteenth, and seventeenth aspects or a first reading step according to a fourteenth or fifteenth aspect. The charge reading process of the reference timing generator 50, the scanning line scanner 54, the driving pulse generator 52, and the second horizontal transmission unit 60 of the image capturing element 100 for capturing an image by performing different scanning methods on regions in the image capture processing system 10 from the entire exposure region of the sensor cell array 56 corresponds to a second reading unit according to any one of the first, second, fourth, sixth, seventh, eighth, ninth, and sixteenth aspects or a second reading step according to the fourteenth or fifteenth aspect. The process of generating the specific region_vertical synchronization signal performed by the scanning line scanner 54 corresponds to a specific region reference signal generating unit according to a third aspect.

In the above-described embodiment, the sensor cell array 56 corresponds to a first photoelectric converter according to any one of the first, second, fourteenth, fifteenth, sixteenth, and seventeenth aspects, and the movement region image data corresponds to second image data according to any one of the second, fifth, sixth, seventh, thirteenth, fifteenth, sixteenth, and seventeenth aspects. The background image data corresponds to first image data according to the second, tenth, twelfth, thirteenth, fifteenth, sixteenth, and seventeenth aspects. The process of generating (updating) the background image data performed by the timing controller 12b, the background pixel determining/updating unit 12e, the memory access arbitrator 12f of the image processing system 12, and the frame memory 14 corresponds to a first image data generating unit according to any one of the second, tenth, eleventh, twelfth, sixteenth, and seventeenth aspects or a first image data generating step according to a fifteenth aspect. The process of generating (updating) the movement region image data performed by the timing controller 12b, the high-speed scanning image generator 12c, the movement region pixel determining/updating unit 12d, the memory access arbitrator 12f of the image processing system 12, and the frame memory 14 corresponds to a second image data generating unit according to any one of the second, sixth, seventh, eighth, ninth, sixteenth, and seventeenth aspects or a second image data generating step according to the fifteenth aspect. The frame memory 14 corresponds to a first image data storage unit according to any one of the second, seventh, twelfth, thirteenth, sixteenth, and seventeenth aspects, a first image data storing step according to the fifteenth aspect, a second image data storage unit according to any one of the second, sixth, seventh, thirteenth, sixteenth, and seventeenth aspects, or a second image data generating step according to the fifteenth aspect. The output reader 12g corresponds to a captured image data generating unit according to any one of the second, thirteenth, sixteenth, and seventeenth aspects or a captured image data generating step according to the fifteenth aspect.

In the above-described aspect, the image capture processing system 10, the image processing system 12, and the frame memory 14 are provided in one apparatus, but the invention is not limited thereto. For example, the image capture processing system 10, the image processing system 12, and the frame memory 14 may be provided in separate apparatuses, and may be connected to each other so as to communicate with each other over a communication network (which corresponds to an image capturing system according to the sixteenth aspect). This structure makes it possible to separate the image capturing system from the image processing system (including the frame memory). For example, an apparatus including a plurality of image capture processing systems and an apparatus including an image processing system may be connected to each other so as to communicate with each other over the Internet, and the apparatus including one image processing apparatus far away from the apparatuses including the plurality of image capture processing systems may process captured image data from the plurality of image capture processing systems, which makes it possible to collectively manage the captured image data. Further, in this structure, an apparatus including the image processing system 12 and the frame memory 14 corresponds to an image processing apparatus according to the seventeenth aspect.

In the above-described embodiment, one specific scanning region (specific region) is set in the entire scanning region (the entire exposure region), but the invention is not limited thereto. For example, two or more specific scanning regions may be set in the entire scanning region in the range in which the non-destructive reading of normal charge can be performed.

Further, in the above-described embodiment, one of the high-speed scanning pixel data and the background pixel data is selected to generate update data, on the basis of a brightness value and a predetermined threshold value, and the generated update data is used to generate (update) the movement region image data, but the invention is not limited thereto. For example, only the high-speed scanning pixel data may be used to generate update data without performing a determining process, and the generated update data may be used to generate (update) movement region image data.

Furthermore, in the above-described embodiment, an address number of pixel data to be read is counted at the timing when image data is read. When the address number of the pixel data is an address number of background pixel data, the pixel data is read from the background image data stored in the frame memory 14, and is then output to the output device. On the other hand, when the address number of the pixel data is an address number of movement region image data, the pixel data is read from the movement region image data stored in the frame memory 14, and is then output to the output device. The background image data and the movement region image data are separately read and then combined with each other. However, the invention is not limited thereto. For example, the image processing system 12 may combine the background image data with the movement region image date beforehand and output the combined image data to the output device.

The entire disclosure of Japanese Patent Application Nos: 2006-013598, filed Jan. 23, 2006 and 2006-316726, filed Nov. 24, 2006 are expressly incorporated by reference herein.

What is claimed is:

1. An image capturing apparatus that has an electric shutter function of controlling exposure time for each frame, comprising:
a photoelectric converter that has a plurality of photoelectric conversion elements arranged in a matrix each of which converts light into charge and stores the converted charge;
a first reading unit that reads charge exposed for a predetermined exposure time from each pixel formed by the photoelectric conversion elements in an entire exposure region of the photoelectric converter by a destructive readout method;
a second reading unit that reads charge from each pixel formed by the photoelectric conversion elements in a specific region, which is a portion of the entire exposure region of the photoelectric converter, plural times by a non-destructive readout method in a period in which the first reading unit reads the charge from the entire exposure region;
a first image data generating unit that generates first image data on the basis of first pixel data composed of the charge that is read by the first reading unit from the entire exposure region by exposure for a predetermined exposure time;

a first image data storage unit that stores the first image data generated by the first image data generating unit;

a second image data generating unit that generates second image data on the basis of plural types of second pixel data composed of charges that are read by the second reading unit from the specific region by exposure for different exposure times;

a second image data storage unit that stores the second image data generated by the second image data generating unit; and a captured image data generating unit that combines the stored second image data and the stored first image data to generate captured image data, wherein the second pixel data is composed of differential values between pixel values of pixel data composed of charges that are read plural times by the second reading unit at plural types of exposure times and a pixel value of pixel data composed of charge that is read by the second reading unit at an exposure time shorter than each of the plural types of exposure times.

2. The image capturing apparatus according to claim 1, wherein the charge read at the exposure time shorter than each of the plural types of exposure times is charge read at the exposure time immediately before each of the exposure times.

3. An image capturing apparatus that has an electric shutter function of controlling exposure time for each frame, comprising:

a photoelectric converter that has a plurality of photoelectric conversion elements arranged in a matrix each of which converts light into charge and stores the converted charge;

a first reading unit that reads charge exposed for a predetermined exposure time from each pixel formed by the photoelectric conversion elements in an entire exposure region of the photoelectric converter by a destructive readout method;

a second reading unit that reads charge from each pixel formed by the photoelectric conversion elements in a specific region, which is a portion of the entire exposure region of the photoelectric converter, plural times by a non-destructive readout method in a period in which the first reading unit reads the charge from the entire exposure region;

a first image data generating unit that generates first image data on the basis of first pixel data composed of the charge that is read by the first reading unit from the entire exposure region by exposure for a predetermined exposure time;

a first image data storage unit that stores the first image data generated by the first image data generating unit;

a second image data generating unit that generates second image data on the basis of plural types of second pixel data composed of charges that are read by the second reading unit from the specific region by exposure for different exposure times;

a second image data storage unit that stores the second image data generated by the second image data generating unit;

a captured image data generating unit that combines the stored second image data and the stored first image data to generate captured image data; and a specific region reference signal generating unit that generates a reference signal for designating the range of the specific region in the entire exposure region, wherein the second image data generating unit corrects a pixel value of the second pixel data on the basis of the number of times the second reading unit reads charge from each pixel of the specific region.

* * * * *